(12) United States Patent
Hanson et al.

(10) Patent No.: US 7,955,688 B2
(45) Date of Patent: Jun. 7, 2011

(54) WAVE-LIKE STRUCTURES BONDED TO FLAT SURFACES IN UNITIZED COMPOSITES AND METHODS FOR MAKING SAME

(75) Inventors: James P. Hanson, Lawton, MI (US); Larry L. Pio, Portage, MI (US)

(73) Assignee: Marketing Technology Service, Inc., Kalamazoo, MI (US)

( * ) Notice: Subject to any disclaimer, the term of this patent is extended or adjusted under 35 U.S.C. 154(b) by 0 days.

(21) Appl. No.: 12/476,965

(22) Filed: Jun. 2, 2009

(65) Prior Publication Data
US 2009/0239026 A1    Sep. 24, 2009

Related U.S. Application Data

(62) Division of application No. 11/811,965, filed on Jun. 13, 2007.

(51) Int. Cl.
*B32B 3/00* (2006.01)
(52) U.S. Cl. .......................................... 428/172; 442/398
(58) Field of Classification Search .................. 428/98, 428/113, 114, 161, 162, 163, 172, 176, 181, 428/184; 442/398
See application file for complete search history.

(56) References Cited

U.S. PATENT DOCUMENTS

| | | | |
|---|---|---|---|
| 2,409,066 A | 10/1946 | Powell et al. | |
| 2,500,690 A | 3/1950 | Lannan | |
| 3,012,923 A | 12/1961 | Slayter | |
| 3,180,775 A | 4/1965 | Sexsmith | |
| 3,214,323 A | 10/1965 | Russell et al. | |
| 4,289,513 A | 9/1981 | Brownhill et al. | |
| 4,578,070 A * | 3/1986 | Holtman | 604/378 |
| 5,491,016 A | 2/1996 | Kaiser et al. | |
| 6,090,469 A | 7/2000 | Wadsworth et al. | |
| 6,635,136 B2 | 10/2003 | White et al. | |
| 6,867,156 B1 | 3/2005 | White et al. | |
| 6,998,164 B2 | 2/2006 | Neely et al. | |
| 7,045,029 B2 | 5/2006 | DeLucia et al. | |
| 7,238,403 B2 * | 7/2007 | Koslow et al. | 428/76 |
| 2003/0022584 A1 | 1/2003 | Latimer et al. | |
| 2003/0213109 A1 | 11/2003 | Neely et al. | |

OTHER PUBLICATIONS

PCT International Search Report, International Application No. PCT/US07/71230, Mailed on Jun. 25, 2008, 2 pages.

* cited by examiner

*Primary Examiner* — Arti Singh-Pandey
(74) *Attorney, Agent, or Firm* — Price, Heneveld, Cooper, DeWitt & Litton, LLP

(57) ABSTRACT

A simplified manufacturing technique to directly form a unitized composite structure with at least one relatively flat surface and at least one sinuous element in an internally-bonded unitized composite is provided. A matrix of fibrous and or other materials is deposited in layers which are subsequently formed into corrugated or wave-like shapes and exposed to an activation step. At least one element is composed of a contractive material which shrinks when activated, such as by heating in an oven, to become relatively flat and optionally bonded to at least one other non-contractive layer which remains in a sinuous shape after the activation step.

12 Claims, 34 Drawing Sheets

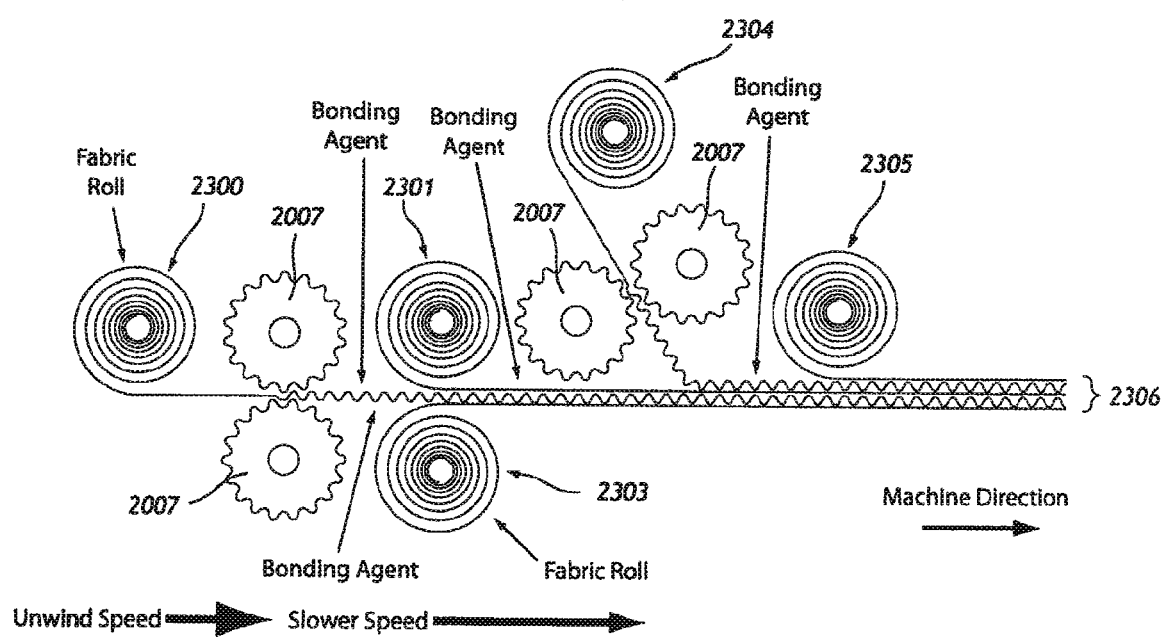

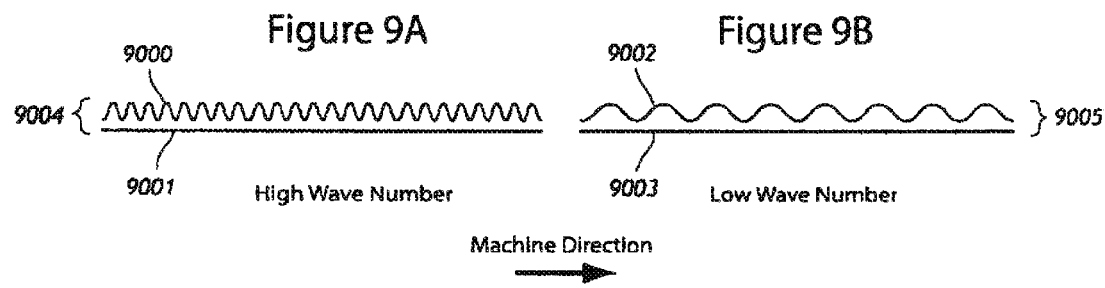
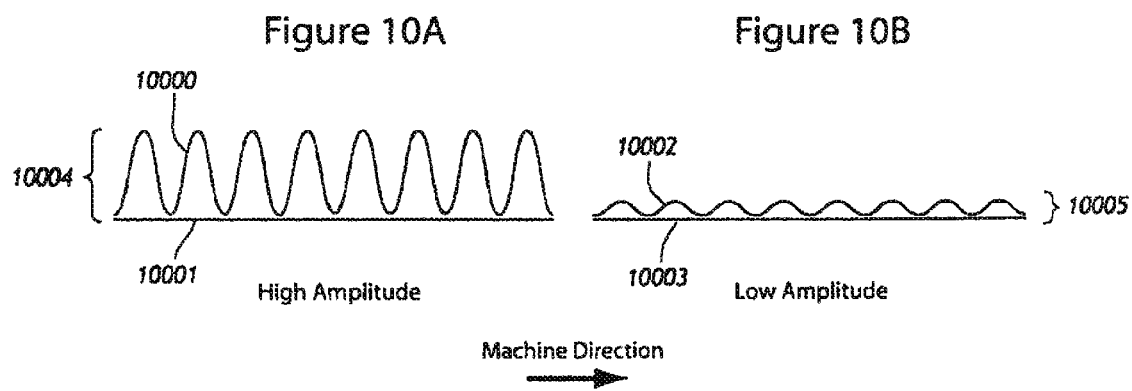

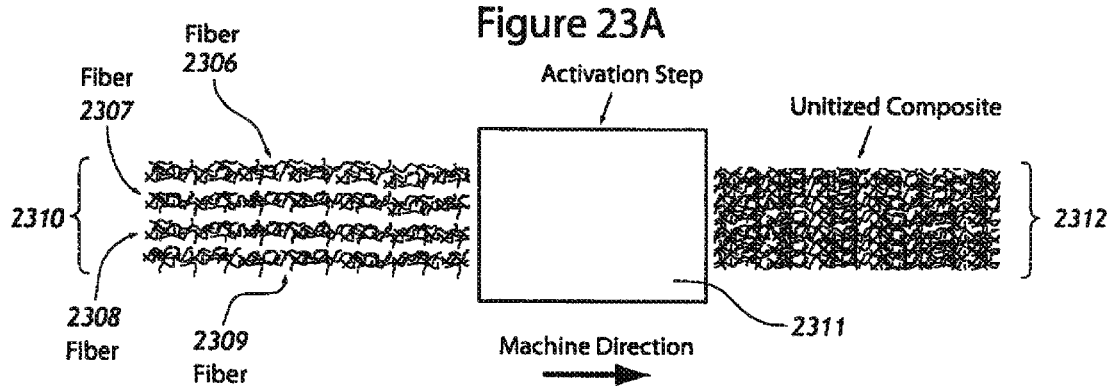
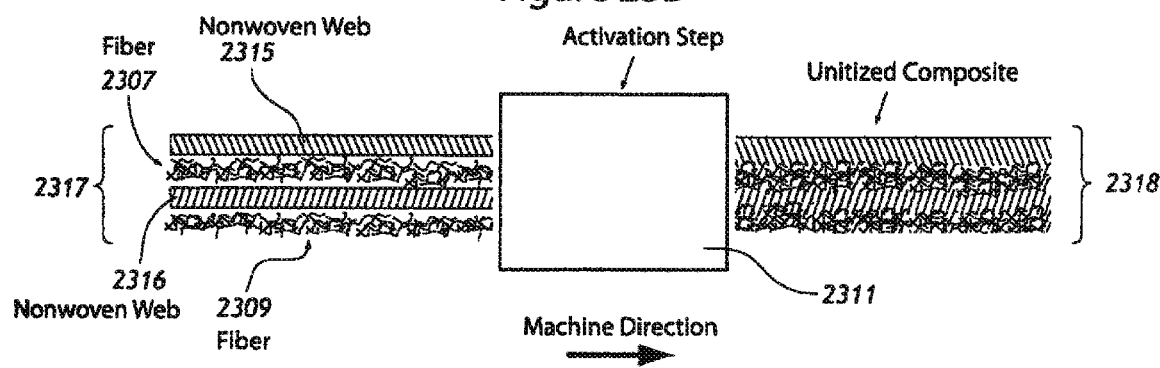

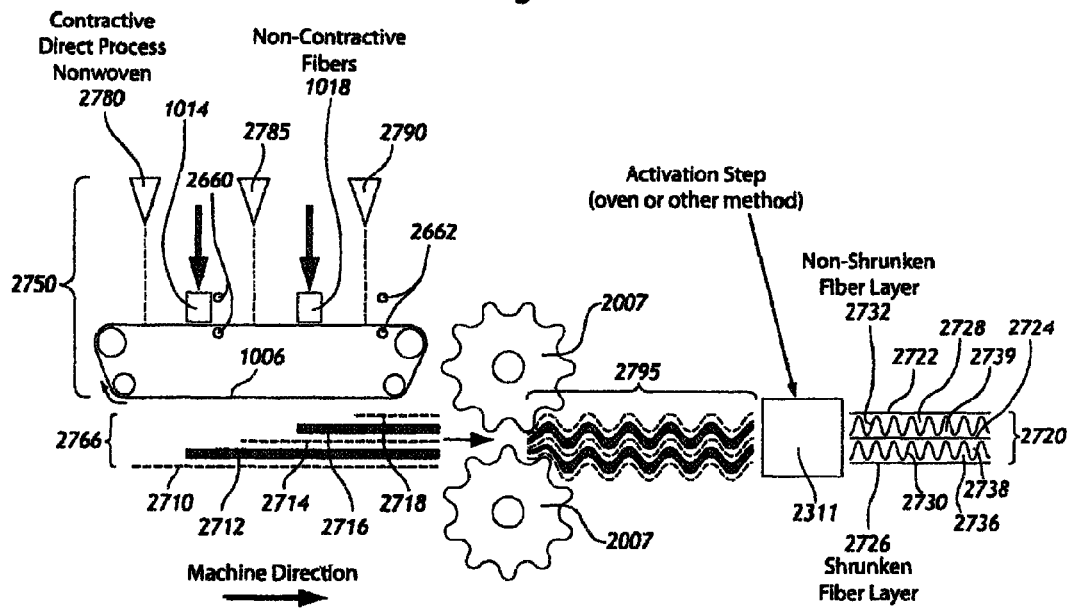
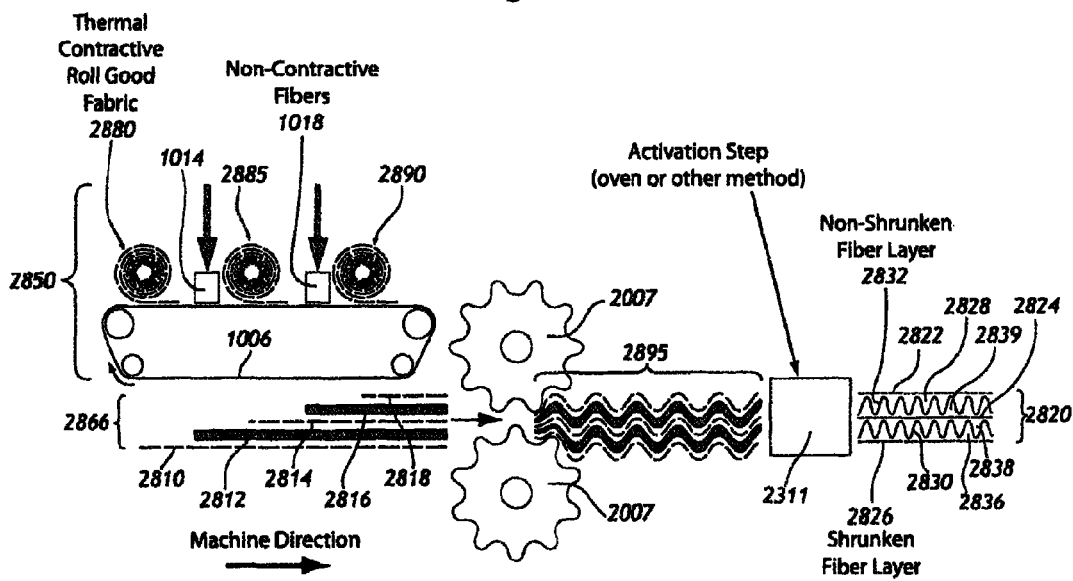

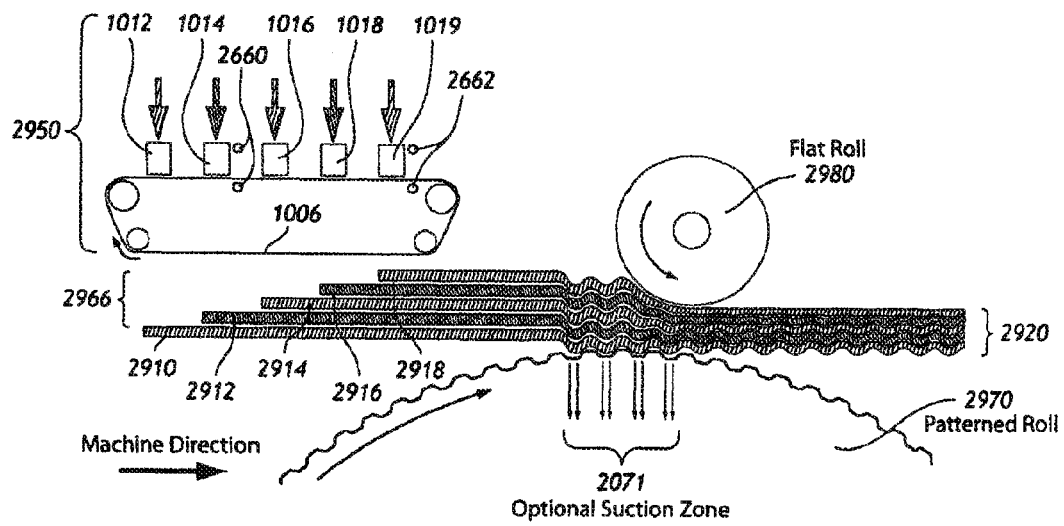
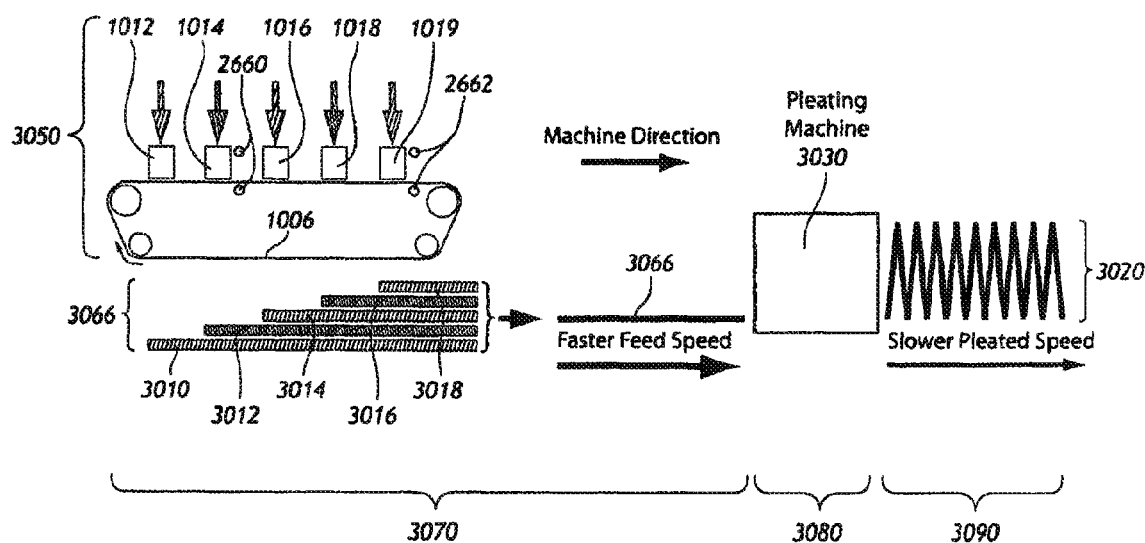

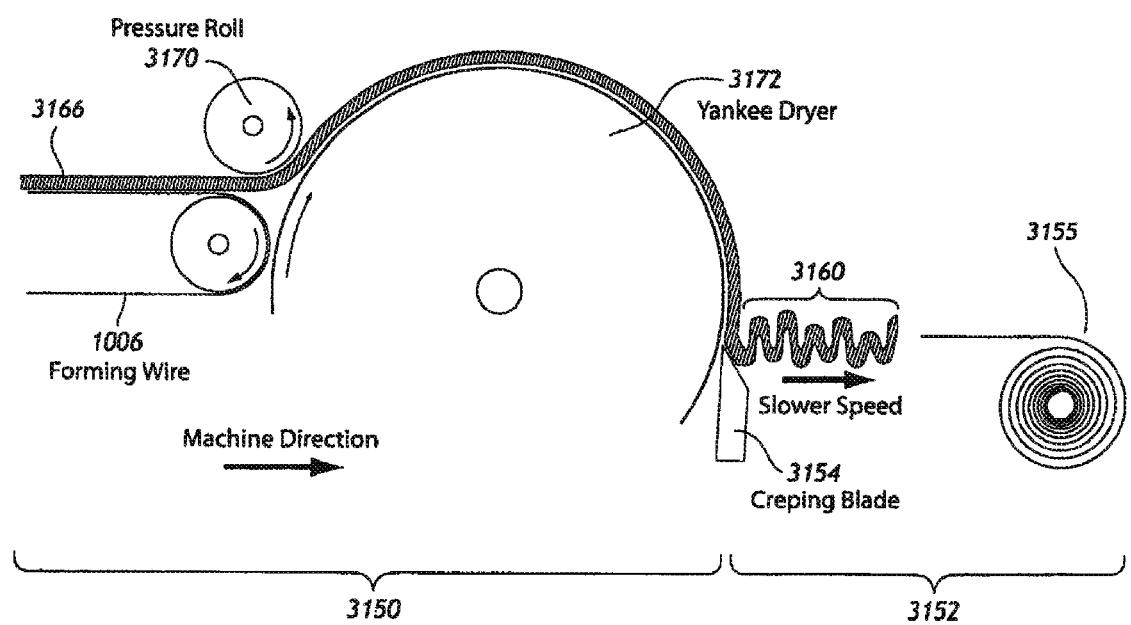

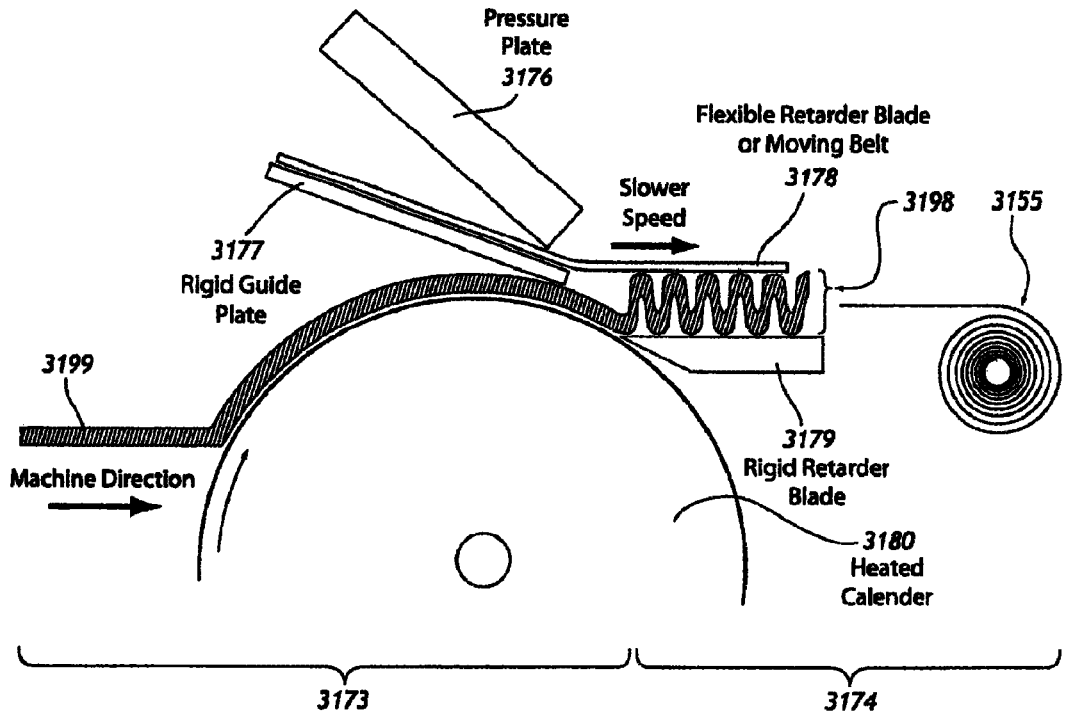
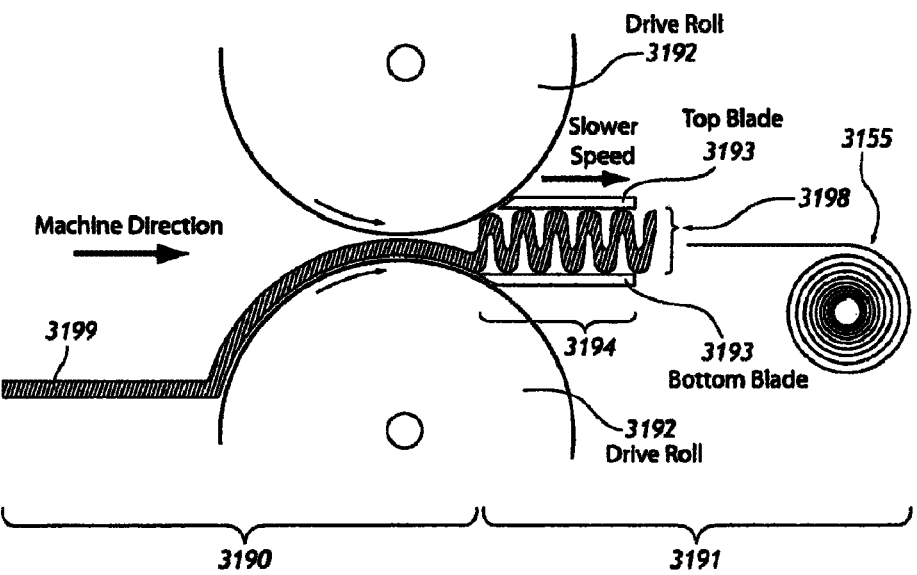

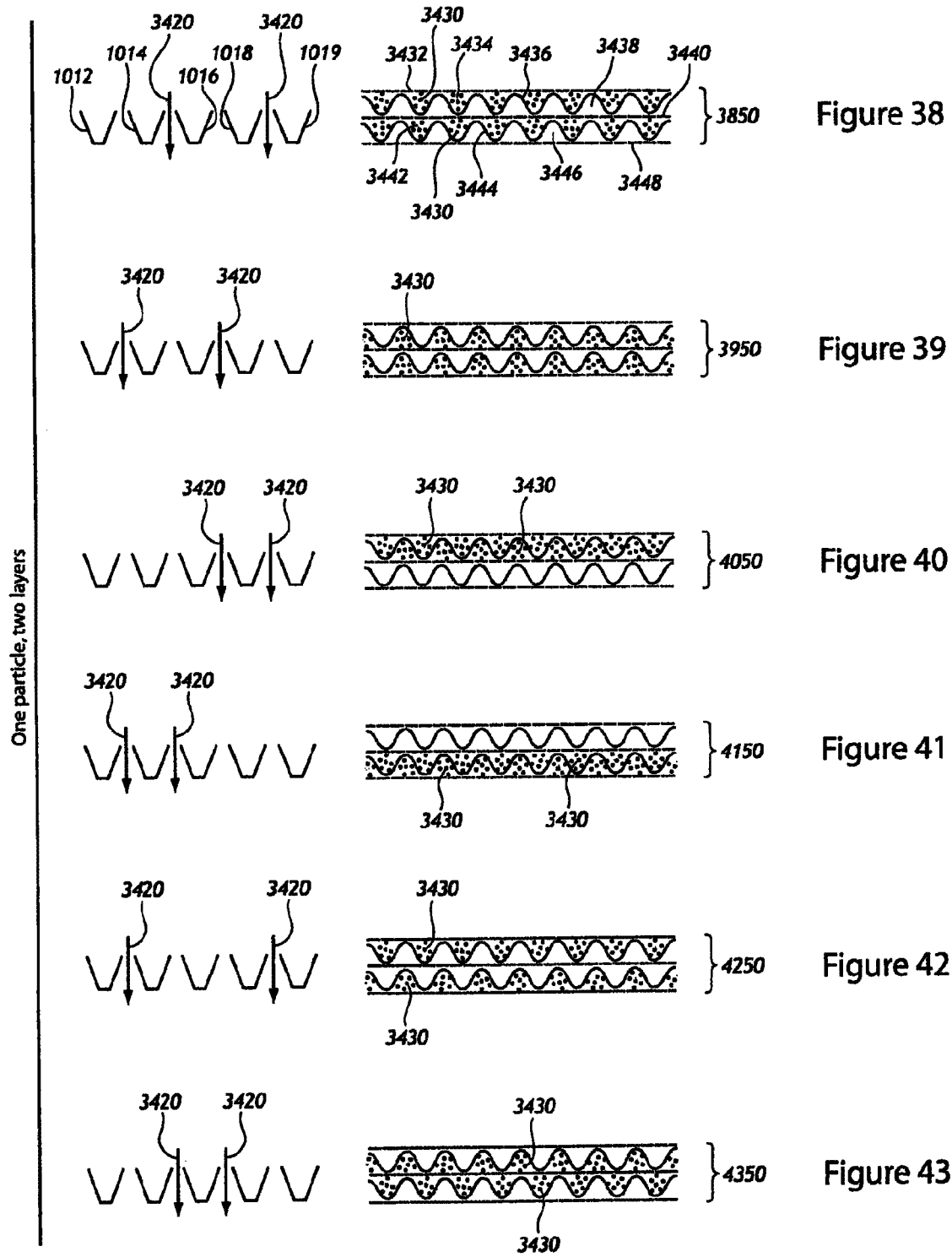

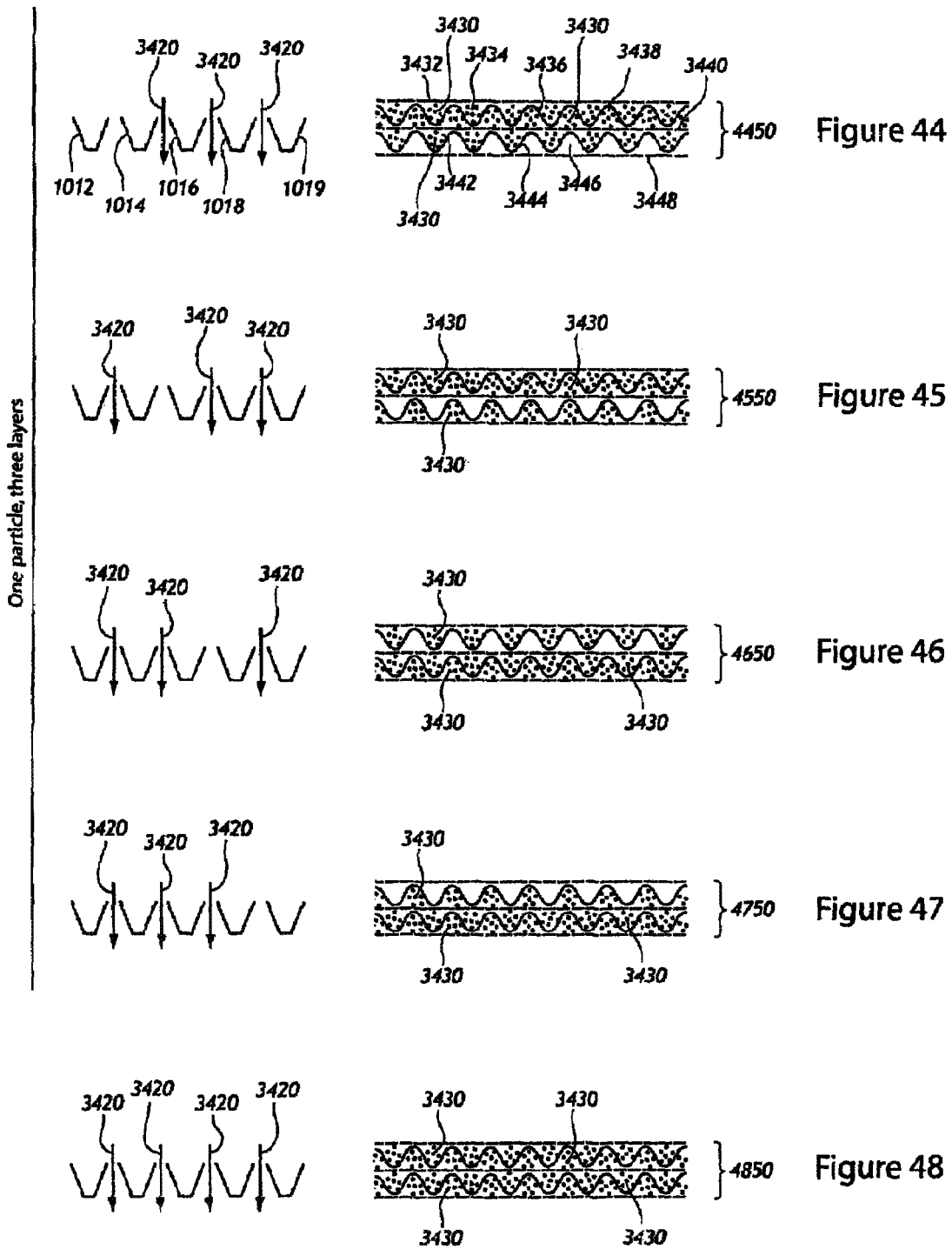

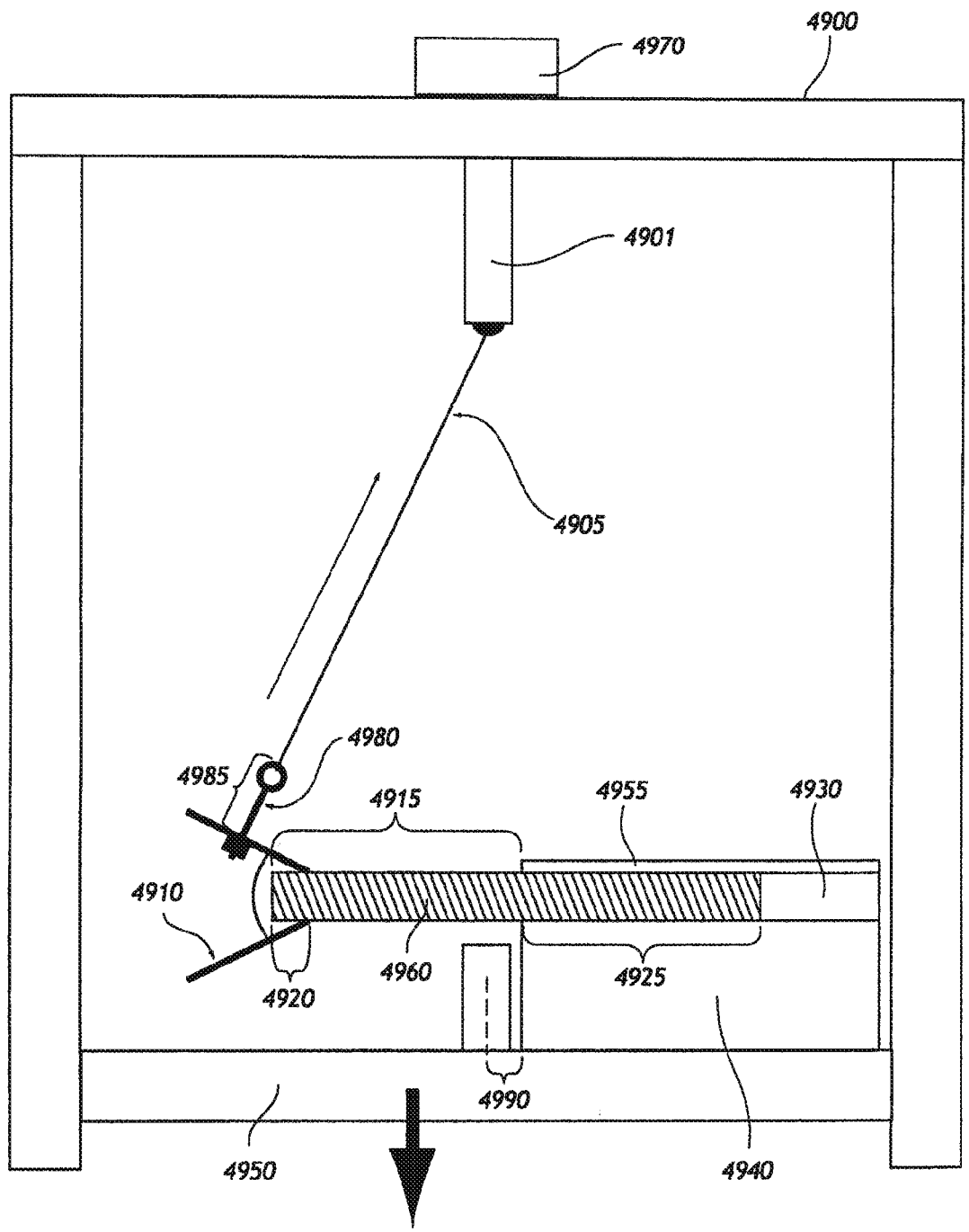
Figure 49 - Bending Force Tester

Figure 56 (2X)
Figure 57 (2X)
Figure 58 (2X)
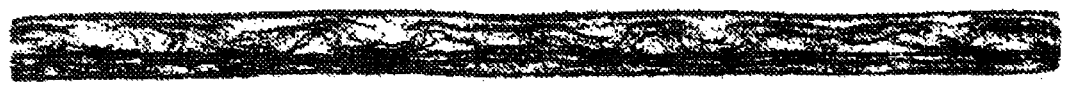
Figure 59 (2X)
Figure 60 (2X)

Figure 61 (2X)
Figure 62 (2X)
Figure 63 (2X)
Figure 64 (2X)
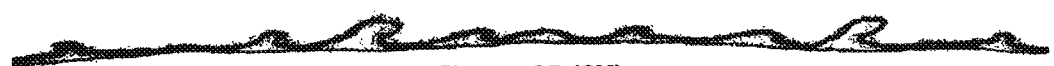
Figure 65 (2X)
Figure 66 (2X)

Figure 67 (2X)
Figure 68 (2X)
Figure 69 (2X)
Figure 70 (2X)
Figure 71 (2X)
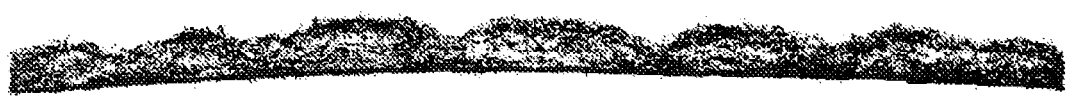
Figure 72 (2X)

Figure 73 (4X)
Figure 74 (4X)
Figure 75 (2X)
Figure 76 (4X)
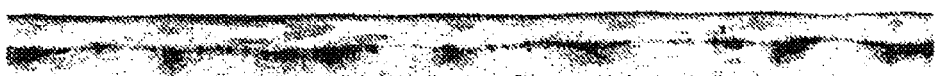
Figure 77 (2X)

WAVE-LIKE STRUCTURES BONDED TO FLAT SURFACES IN UNITIZED COMPOSITES AND METHODS FOR MAKING SAME

CROSS-REFERENCE TO RELATED APPLICATIONS

This application is a divisional of U.S. application Ser. No. 11/811,965 entitled WAVE-LIKE STRUCTURES BONDED TO FLAT SURFACES IN UNITIZED COMPOSITES AND METHODS FOR MAKING SAME, filed Jun. 13, 2007 the entire disclosure of which is incorporated herein by reference.

FIELD OF THE INVENTION

The present invention relates to the manufacture of unitized composite fabric structures with at least one sinuous element and at least one relatively flat element affixed to each other.

BACKGROUND OF THE INVENTION

Nonwovens, films, textiles, papers and paperboard materials as normally manufactured are relatively smooth, flat-surfaced and uniform in density, and are thin compared to their length and width. When thicker structures with at least one smooth side are desired, well-known corrugation and lamination processes are commonly used to combine and bond at least one relatively flat roll good material with at least one other relatively flat roll good material which is corrugated into a sinuous or undulant form and bonded to the relatively flat material, usually with some kind of bonding agent.

The resulting lamination yields a combined bonded laminate structure which is relatively thicker and therefore lower in overall density than it would be had the roll goods been combined and bonded together in their original flat forms without corrugation. In addition, laminations combining one or more corrugated elements—bonded to one or more flat supporting elements—often offer additional beneficial properties to the resulting laminated structure, such as controllable z-direction compressibility, overall structural rigidity, load bearing capability, cushioning abilities, insulation properties and a wide variety of other structural and functional benefits with reasonably efficient use of raw materials.

The common corrugated paperboard box that is widely used to protect products during shipment and storage is one illustrative example of the established lamination and corrugation processes in common use. The bonded combination of at least one relatively flat-surface with at least one corrugated, sinuous or undulant layer results in a lower overall density in the combined structure with such desirable functional properties as stiffness control, structural rigidity, and load bearing strength, and with a desirable smooth outer surface for printability and appearance. While lamination techniques are useful, they require separately-made roll goods, corrugation and lamination process equipment to produce raised corrugated elements bonded to other flat roll good elements.

SUMMARY OF THE INVENTION

According to an aspect of the invention, one or more relatively smooth and flat-surfaced elements bonded to one or more corrugated or sinuous elements is produced directly in a single unitized composite.

According to another aspect of the invention, discretely layered elements of such a unitized composite may be assembled by depositing individual fibrous elements on top of other fibrous elements to assemble un-bonded layers which are optionally compressed as individual layers and also optionally compressed overall as a multilayer assembly.

According to another aspect of the invention, combinations of contractive and non-contractive elements may be made of a single component or various blends of fibers, with nonwoven or other technologies produced in-situ, or with elements introduced as previously-made roll goods.

According to another aspect of the invention, at least one element of a multiple layer assembly may be made of one or more thermoplastic materials.

According to another aspect of the invention, at least one element of a layered assembly may be made of materials which contain a substantial portion of contractive or shrinkable material that can be caused to shrink when exposed to relatively high temperatures (near the material's melting point) in an oven or by some other device or method for activating the shrinking behavior when desired and at least one of the layers of the layered assembly can be relatively non-contractive.

According to another aspect of the invention, the assembly can be shaped into a sinuous form by using corrugating rolls, by use of three-dimensionally shaped surfaces in the desired shape—such as by a patterned roll or belt—by folding techniques, by creping, or by using Micrexing® technique or similar mechanical techniques.

According to another aspect of the invention, the layered assembly is shaped into a sinuous form by using a transfer wire or other transfer device which may be raised above the horizontal plane of the oven surface conveyor, which oven surface conveyor is traveling at a slower speed than the raised transfer device.

According to another aspect of the invention, the entire un-bonded assembly of layers shaped into sinuous forms is heated in an oven or subjected to other activating devices or methods so that the contractive layers shrink relative to the non-contractive layers and become relatively flat while the non-contractive layers remain in a sinuous form bonded to the flat layers when cooled.

According to another aspect of the invention, particles are optionally added to the layers and between the layers during assembly.

According to another aspect of the invention, some embodiments, with careful selection of materials and conditions, can show a very high stiffness and puncture resistance. Higher number of alternating flat and sinuous layers may increase favorable results. Adjusting material selection to include fire resistant chemistry, either within the materials, or as a separate chemical addition, is specifically contemplated for use in structural applications.

According to another aspect of the invention the number of undulations per unit length may be so high that the shrinkable layer(s) cannot fully shrink to approach a flat condition, but will still result in high stiffness and favorable structural characteristics due to the shrinking layer(s). The shrinkable layer(s) will still exhibit a less sinuous characteristic than the sinuous layers while not becoming a completely flat layer after activation.

According to another aspect of the invention, it is contemplated that metallic, carbonaceous, ceramic, or other nontraditional elements can be used to produce very unique and desirable composites.

These and other features, advantages and objects of the present invention will be further understood and appreciated by those skilled in the art by reference to the following specification, claims and appended drawings.

BRIEF DESCRIPTION OF THE DRAWINGS

Exemplary embodiments of the invention will be described with reference to the drawings of which:

FIG. 4 shows a more complex process for combining flat roll good fabrics into three-dimensional laminated structures with sinuous elements affixed to flat-surfaced elements.

FIG. 9A shows relatively lower wavelength (high wave number) sinuous structure in a composite assembly.

FIG. 9B shows relatively higher wavelength (low wave number) sinuous structure in a composite assembly.

FIG. 10A shows relatively higher amplitude sinuous structure in a composite assembly.

FIG. 10B shows relatively lower amplitude sinuous structure in a composite assembly.

FIG. 23A shows an assembly of loose fiber layers which are bonded into a unitized composite.

FIG. 23B shows an assembly of loose fiber layers and nonwoven layers which are bonded into a unitized composite.

FIG. 27 shows another airlaid process assembling non-contractive loose fibers and additional relatively contractive nonwoven elements produced in situ, which are shaped into a sinuous structure, followed by an activation step.

FIG. 28 shows another unitized composite made by depositing non-contractive layers of loose fibers and additional contractive roll goods shaped into a sinuous structure, followed by an activation step.

FIG. 29 shows an exemplary method of shaping an assembly into a three-dimensional sinuous structure using a patterned roll with recessed surface.

FIG. 30 shows an exemplary method of shaping an assembly using pleating or folding techniques to form more distinct folds or sinuous structures.

FIG. 31A shows another method of producing three-dimensional raised structures using creping techniques.

FIGS. 31B-C show methods of producing three-dimensional raised structures using aspects of the Micrex® microcreping process.

FIGS. 34 through 48 show optional exemplary additions of particles added between the forming heads and the resulting locations of such particles within the unitized composite after activation and bonding.

FIG. 49 shows a bending force testing device.

FIGS. 50-77 are optical micrographs of exemplary unitized composites.

DETAILED DESCRIPTION OF THE INVENTION

Figure 1:
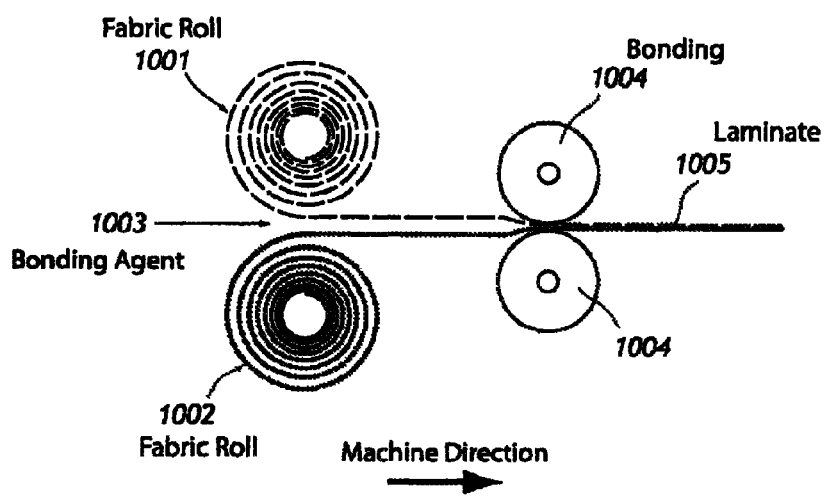
FIG. 1 shows an exemplary two-dimensional view of a lamination technique used to bond two previously made fabrics.

Although the invention is illustrated and described herein with reference to specific embodiments, the invention is not intended to be limited to the details shown. Rather, various modifications may be made in the details within the scope and range of equivalents of the claims and without departing from the invention. Also, the embodiments selected for illustration in the figures are not shown to scale and are not limited to the proportions shown.

As used herein, the term "nonwovens" defines a web having a structure made of individual fibers which are interlaid, but not in an ordered or identifiable manner, such as found in a woven or knitted web. As defined by INDA, a trade association representing the nonwoven fabrics industry, nonwoven fabrics are generally sheet or web structures bonded together by entangling fiber or filaments (and by perforating films) mechanically, thermally or chemically.

Nonwoven webs are formed from many processes, such as, for example, airlaying, carding, meltblowing, spunbonding, spunmelting, Co-forming™, wet forming, scrim and netting extrusion, perforated films and other such processes. The term "airlaid" implies that a nonwoven web is formed by a dry airlaying process, which uses air to transport and deposit assemblies of loose fibers on a substrate such as a porous collecting wire.

As used herein, the term "bi-component fiber" refers to a fiber having two components, such as fibers comprising a core composed of one material (such as a polymer) that is encased within a sheath composed of a different material (such as another polymer with a different melting point). Some types of "bi-component" fibers can be used as binder fibers that can be bound to one another and to other fibers or components to form a unitized structure after heating in an oven or by some other activating method. For example, in a polymeric bicomponent fiber, the polymer comprising the sheath often melts at a different, typically lower, temperature than the polymer comprising the core. As a result, such binder fibers provide thermal bonding after appropriate heating (activation) and subsequent cooling due to melting of the sheath polymer, while retaining the desirable strength and fibrous structure characteristics of the core polymer which does not melt. As an alternative to using a bicomponent binder fiber, multi-component fibers, mono-component filaments, extrusions, films, scrims, nettings, particles, powders, emulsion polymers and resins in numerous chemistries and forms can also be used to bond fibrous structures and roll goods, in addition to mechanical bonding methods such as needling and hydro-entangling.

As used herein, the term "element" refers to one individual component of a unitized structure, assembly, composite, or lamination, i.e., a layer, fiber, particle, filler, or any other component that can be incorporated (e.g., fusion bonded, adhesively bonded, physically bonded by entanglement or the like, or occluded within) into a unitized structure, assembly, composite, or lamination.

As used herein, the term "assembly" refers to a layered combination of two or more components or elements of a unitized structure or a laminated structure. Composite assemblies, according to the present invention, are optionally made by assembly techniques such as by airlaying, carding, direct process nonwovens such as by spunbonding, spunmelting or meltblowing, Co-forming™, extrusions, or with scrims and films or other techniques to include, optionally, such web-like materials. These materials can be combined into layered assemblies of multiple layers with fibrous assemblies and subsequently bonded together to produce a unitized composite structure, using an oven or other activation step to cause the layers to adhere to each other to form a unitized composite after bonding.

As used herein, the terms "unitized structure" or "unitized composite" refer interchangeably to the structure resulting from bonding assemblies in an oven or other device or method which causes the layers to bond together.

As used herein, the term "layer" encompasses an individual layer or strata in an assembly, which may or may not be perfectly discrete from other layers.

As used herein, the terms "contractive" or "shrinkable" refer interchangeably to elements which substantially contract or shrink when processed in an oven or by another activation device or process.

As used herein, the terms "non-contractive" or "non-shrinkable" refer interchangeably to elements that do not shrink substantially, relative to the contractive elements, when processed in an oven or other activation step which causes contraction of a shrinkable element.

Figure 2:
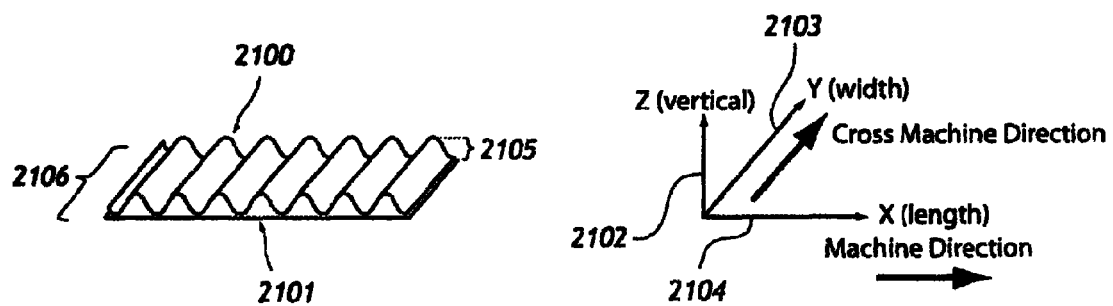
FIG. 2 shows a three-dimensional view of a sinuous structure affixed to a flat-surfaced structure.

As used herein, the terms "corrugated," "sinuous," "undulant," and "wave-like" are all used interchangeably to describe one or more elements of an assembly that resembles a corrugated or wave-like shape, as represented schematically by 2100 of FIG. 2.

The terms "sinuous" or "undulant" refer to wavelike elements characterized by a substantially periodic waveform, not necessarily sinusoidal, that may be further characterized in terms of wavelength and amplitude, the wavelength being the distance between any two corresponding points on successive waves (e.g., the distance between two adjacent crests of a waveform), and the amplitude being the height of the undulations. Alternatively, rather than characterizing the waveform in terms of wavelength, it may be characterized in terms of wavenumber, which is inversely related to wavelength and refers to the number of repeating units of a wave pattern per unit length. The wavenumber is the spacial analogue of frequency. The sinuous or undulant waveforms need not be perfectly recurring or perfectly parallel, and there may be some change in size, shape or other variation of the recurring waveforms.

As used herein, the term "activation" may be any process, whether with a heated oven, by radiation of electromagnetic energy, or by some other method, which causes bonding to occur between elements within one layer, causes bonding to occur between elements in two or more layers, and/or causes contractive behavior of a shrinkable element, if present.

Exemplary embodiments of the invention will be described with reference to the following figures.

FIG. 1 shows a simple and known process for laminating together two previously made relatively flat roll good fabrics 1001 and 1002 with a bonding agent 1003. Bonding occurs between compression rolls 1004 producing bonded laminate 1005 which is relatively flat and thin in the thickness or z-direction. Such a structure is relatively dense and will have a different bending resistance in the machine direction (MD) and in the cross machine direction (CD) than a similar lamination employing a corrugated or sinuous element as depicted in FIG. 2 and described below.

FIG. 2 shows a three-dimensional view of a corrugated or sinuous element 2100 which is raised in the thickness z-direction 2105 and bonded to a relatively flat-surfaced element 2101. Such a bonded structure is lower in density and relatively more resistant to compression and with a different response to bending forces applied to the laminated structure.

FIG. 2 also provides a reference to demonstrate the x, y, and z direction conventions that are referred to herein, showing the length 2104 (x or machine direction (MD)), width 2103 (y or cross machine direction (CD)) and vertical height 2102 (z direction) of a continuous assembly. FIGS. 3 through 38 follow the conventions of FIG. 2 and are depicted as two-dimensional side views showing the vertical thickness (z-direction) and the length (x-direction) but not showing the cross machine width (y-direction) as it is depicted in FIG. 2.

Figure 3:
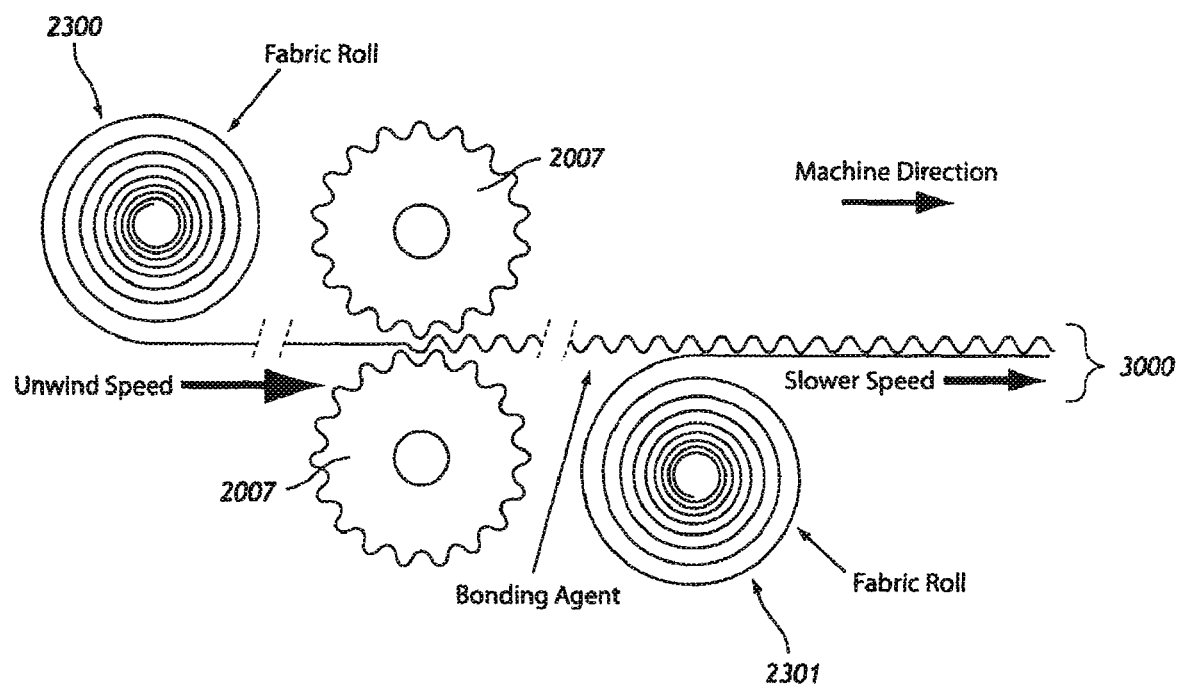
FIG. 3 shows a known process for combining two flat-surfaced roll good fabrics into a bonded three-dimensional laminated structure with a sinuous element affixed to a flat-surfaced element.

FIG. 3 shows an exemplary corrugation and lamination technology for combining two previously made flat-surfaced roll good fabrics, where roll good 2300 is moving faster in the machine direction than fabric roll 2301. Fabric 2300 passes through corrugating rolls 2007 and is bonded to fabric 2301 into a three-dimensional laminated structure with a raised z direction corrugated element affixed to a flat-surfaced element, as generally depicted in FIG. 2. The resulting combined structure, similar to that depicted in FIG. 2, is lower in overall density and higher in overall thickness than an otherwise similar bonded structure produced according to the flat lamination technique depicted in FIG. 1. Manufacturing techniques to produce combined structures with such desirable properties are employed to produce, for example, the common paperboard corrugated boxes widely used to contain and protect items during shipment. While producing the desired structures, known techniques require the combination of previously made roll goods, made in separate processes, which are then combined and bonded together with resulting inefficiencies and expenses.

FIG. 4 shows an exemplary and more complex process technology for combining previously made flat roll good fabrics 2300, 2301, 2303, 2304, 2305 into a three-dimensional laminated structure 2306 with alternating corrugated elements affixed to flat-surfaced elements such as those commonly used to assemble corrugated boxes. Practitioners skilled in the art will recognize that the peaks of the waves of individual corrugated elements are optionally aligned—or not aligned—with the peaks of the waves of the other corrugated elements in the z-direction and that multiple wavelength and amplitude combinations of corrugated undulant elements can be combined with multiple flat-surfaced elements by changing the patterning shapes of the corrugating rolls 2007 and the synchronization parameters of roll speeds. The complexity and cost of the corrugation and lamination process increases as the desired number of layers of flat and corrugated elements is increased as demonstrated in FIG. 4 compared to FIG. 3.

The present invention departs from practice of the above-mentioned techniques and provides a simplified one-pass direct process to make such complex combinations of undulant elements bonded to flat elements, which avoids manufacturing complexity and the requirement of using previously made roll goods.

In an aspect of the invention, an improved manufacturing method for directly producing a unitized composite material has been discovered which avoids the corrugation and lamination processes that combine separately made roll good fabrics. An assembly of layered loose fibers or fabric combinations is formed, where at least one of the layered elements is made of a thermally-sensitive or otherwise contractible material, and at least one of the layered elements is made from one or more non-contractive materials. The un-bonded layered assembly is corrugated or otherwise shaped into a sinuous form and subsequently subjected to a high temperature or other activation process sufficient to cause the contractive element layer(s) to shrink into a relatively flat surface while the non-contractive element layer(s) remain(s) in an un-shrunken corrugated state bonded together with the contractive element layers(s) into a unitized composite. The invention yields—in a single manufacturing process—desirable combinations of flat-surfaced elements and corrugated sinuous elements bonded together internally, and without resorting to previously known techniques of multiple pre-made fabric rolls combined in separate corrugation, lamination and bonding processes.

It has been discovered that producing a structure with both flat and undulant elements simultaneously in a one pass manufacturing technique to make a unitized composite, according to the present invention, can also decrease the amount of materials required, and the expense and complexity associated with converting processes can also be reduced or eliminated. More specifically, it has been recognized that cost and complexity are introduced when multiple separately-produced roll good layers of different materials need to be separately manufactured and then combined during the process of converting raw materials into a finished product. Such assembly requires machinery that is configured to shape and synchronize the positioning of webs of components as they travel continuously along the machine direction. Also, it has been recognized that processes for converting such raw materials into a final product are complicated by the fact that different roll good materials may have different strength and stretch characteristics. Accordingly, reducing the number of raw materials that need to come together to form a finished product in the converting process, or eliminating the need to assemble any roll good components, reduces the cost and complexity associated with the manufacture of such complex finished products.

Additionally, it has been discovered that the utilization of a unitized airlaid composite also reduces overall raw material costs. Because roll good raw materials are often supplied by different companies and may need to be made to particular specifications, there is often a waste of material associated with the procurement of such materials for use in subsequent converting processes. Also, when such materials are purchased from suppliers, the overhead and profit margin associated with such suppliers are added to the cost of the final product.

Additionally, the use of separately formed roll good webs assembled in laminations introduces extra costs associated with the lamination equipment and the bonding materials, such as adhesives, which are normally required to affix the roll goods together into a finished laminate. More specifically, such laminations may also require additional raw materials to provide the necessary minimum strength in such roll goods to survive the rigors of the corrugation and lamination process.

The invention eliminates the need for multiple roll good layers, achieves an overall lower weight unitized composite that can survive process stresses, and reduces the overall amount of materials used and the cost associated with the materials.

Figure 11:
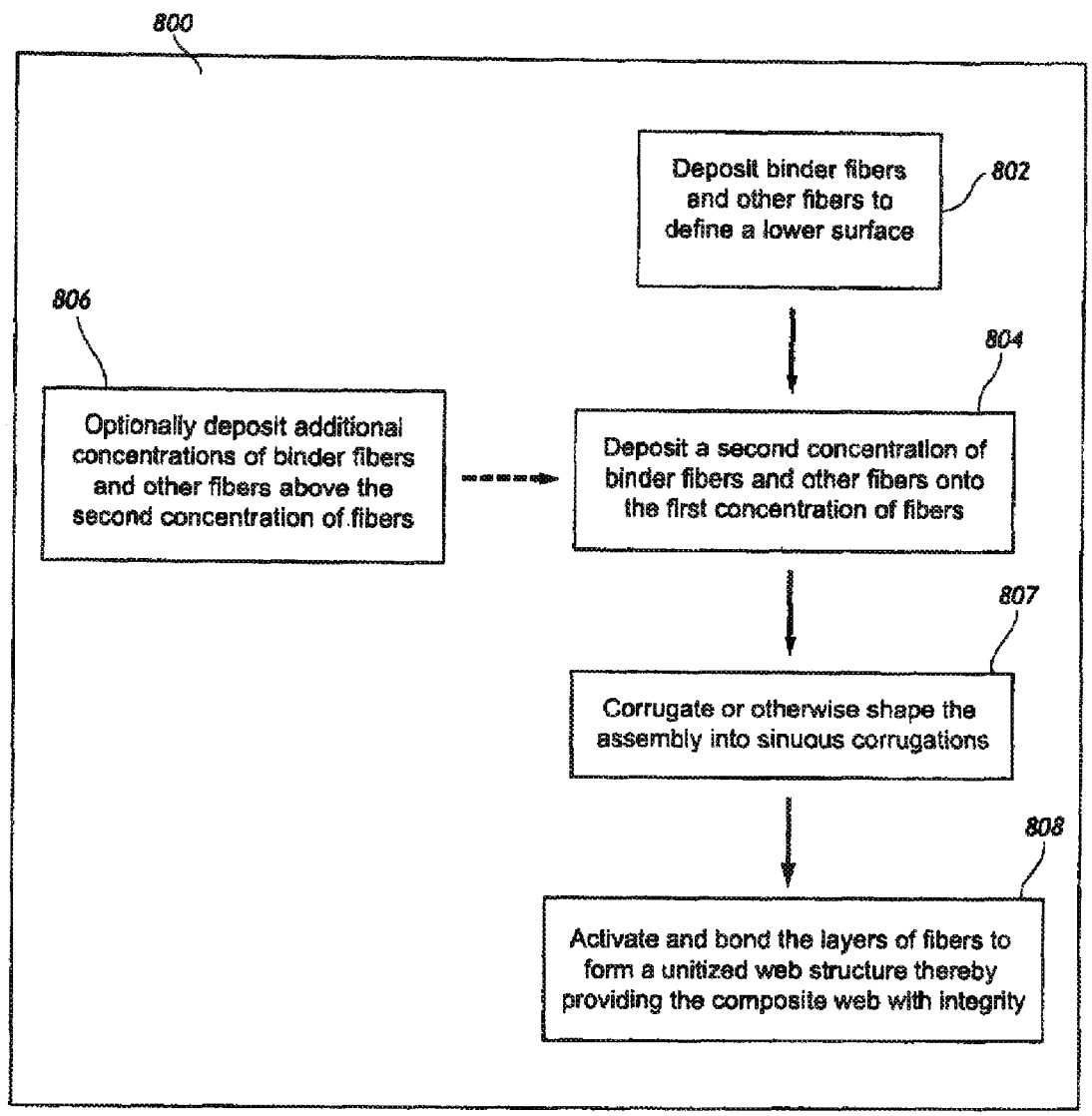
FIG. 11 shows a flow chart of a process for forming a unitized composite according to aspects of this invention.

FIG. 11 is a flow chart 800 of exemplary steps for fabricating a unitized airlaid composite in accordance with one embodiment of the present invention. Block 802 illustrates a step of depositing a first quantity of fibers to define a first layer. Block 804 illustrates the step of depositing a second quantity of fibers onto the first quantity of fibers, wherein the second quantity of fibers is layered on the first quantity of fibers to form a second un-bonded, but relatively discrete, layer. Block 806 illustrates the step of depositing an additional concentration of fibers onto previous layers to further construct multiple layers. Block 807 illustrates the additional step of shaping the layered assembly into a corrugated or sinuous form. Block 808 illustrates the final step of activating and bonding the layers together to form a unitized composite structure. Activation causes the shrinkable elements in the assembly to contract into a relatively flattened state while the non-contractable elements of the assembly remain sinuous.

FIGS. 5A-10B show desirable non-limiting examples of unitized composite structures resulting from the practice of the present invention.

Figure 5A:
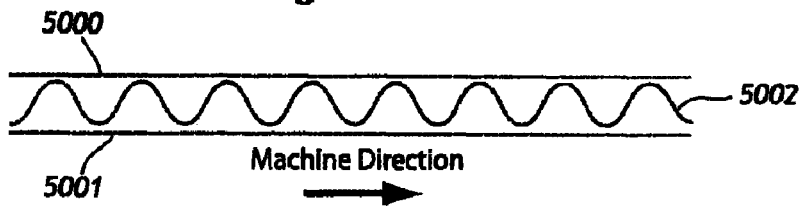
FIGS. 5A-5D show bonded assemblies of flat and sinuous elements with exterior flat surfaces.

FIG. 5A shows a relatively simple exemplary bonded assembly of two relatively flat elements 5000 and 5001 and one corrugated or sinuous element 5002 showing the vertical (z-direction) and machine direction length view (x-direction) going from left to right.

Figure 5B:
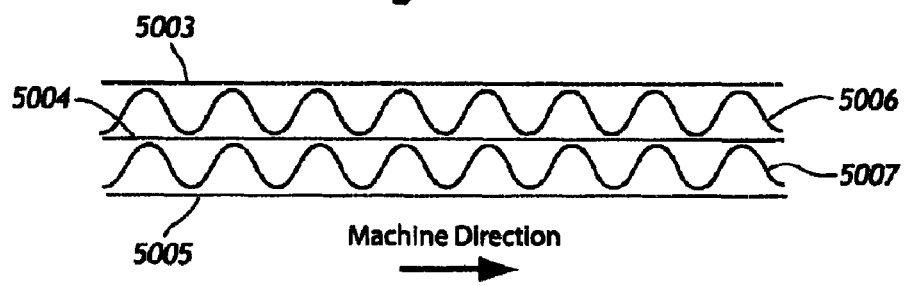

FIG. 5B shows an exemplary and more complex bonded assembly of relatively flat elements 5003, 5004, 5005 and two corrugated sinuous elements 5006 and 5007 showing the vertical (z-direction) and length (x-direction) views. Practitioners skilled in the art will recognize that the peaks and troughs of individual corrugated elements 5006 and 5007 are optionally aligned or optionally not aligned with other corrugated elements in the z-direction and that many such combinations in many additional layering possibilities are possible.

FIGS. 5C-6C show other non-limited examples of layered assemblies of flat and sinuous elements combined in other ways, all of which can be made directly in a one pass manufacturing process using the present invention and without resorting to previously known lamination techniques.

Figure 5C:
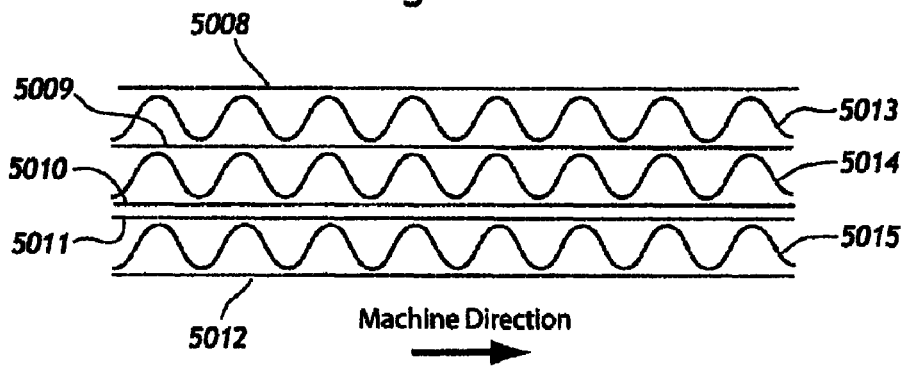

FIG. 5C shows another exemplary, even more complex, bonded assembly of relatively flat and sinuous elements, where two of the relatively flat-surfaced elements 5010 and 5011 are in contact with each other.

Figure 5D:
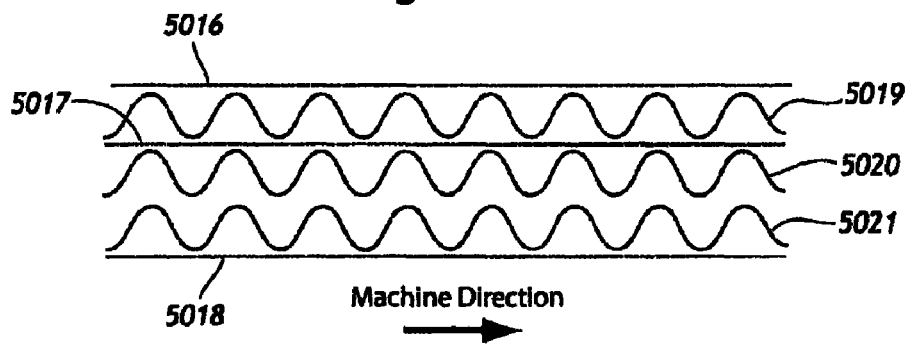

FIG. 5D shows an exemplary bonded assembly of relatively flat and sinuous elements where two of the sinuous elements 5020 and 5021 are in contact with each other.

The present invention also contemplates unitized composites with raised exterior surfaces and relatively flat elements in the interior of the composite.

Figure 6A:
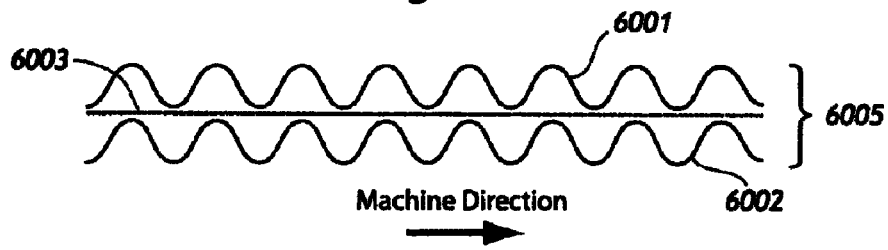
FIGS. 6A-C show assemblies of flat and sinuous elements with exterior sinuous surfaces.

FIG. 6A shows an assembly 6005 of a relatively flat element 6003 and two sinuous elements 6001 and 6002, where the relatively flat element 6003 is in the interior of the bonded composite assembly.

Figure 6B:
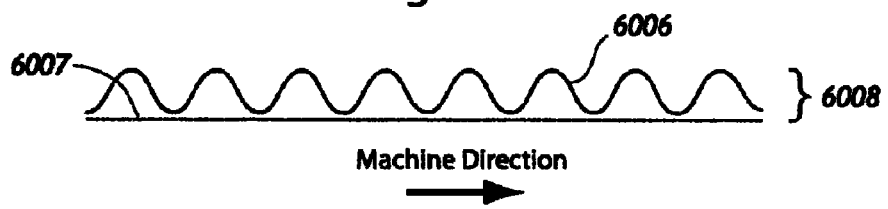

FIG. 6B shows a simpler assembly 6008 of one relatively flat element 6007 and one sinuous element 6006 in a unitized composite.

Figure 6C:
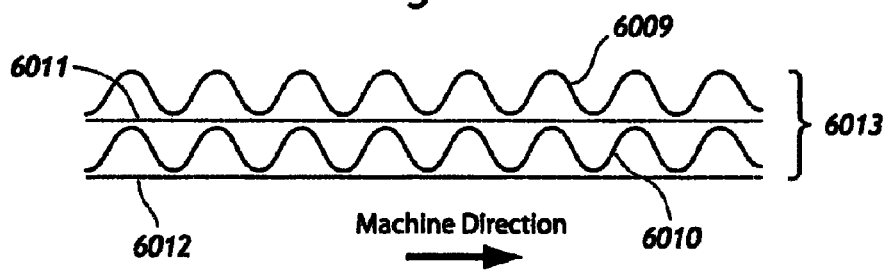

FIG. 6C shows a more complex assembly 6013 with one raised sinuous surface 6009 and one flat surface 6012 with internal sinuous element 6010 and one internal flat element 6011 bonded together in a unitized composite.

Skilled practitioners will also recognize that varying the amplitude or wavelength of sinuous or corrugated elements using corrugation and lamination techniques, such as with corrugating rolls 2007 depicted in FIGS. 3 and 4, requires the installation and use of multiple corrugation rolls, synchronized in speed, and corresponding to the desired shapes, wavelengths and amplitudes to produce the desired sinuous shaping in the final lamination. The use of corrugation and lamination techniques to produce such assemblies may be limited by difficulties in preserving the lofty low density characteristics of separately made lofty roll goods because of compression, alteration of the surface by bonding adhesives, and processing difficulties introduced by variable stretching and compression properties of the various roll goods which have to be unwound and moved through the lamination machinery. By employing aspects of the present invention, even very low density elements affixed to flat surfaces can be effectively produced as desired and with very different densities and physical properties compared to the other elements in the assembly.

Airlaying techniques employed according to one aspect of the present invention for depositing fibers avoids such processing limitations while offering advantages and flexibility to optionally produce fuzzy surfaces on individual elements of an assembly as desired without undesirable compression and possible increase in density or flattening of the fuzzy protrusions. Further, by proper selection of the oven conditions, fiber recipe used, and optionally, the compression conditions applied to individual layers during the airlaying process, the degree to which fibers protrude can be easily controlled in individual layers.

Figure 7:
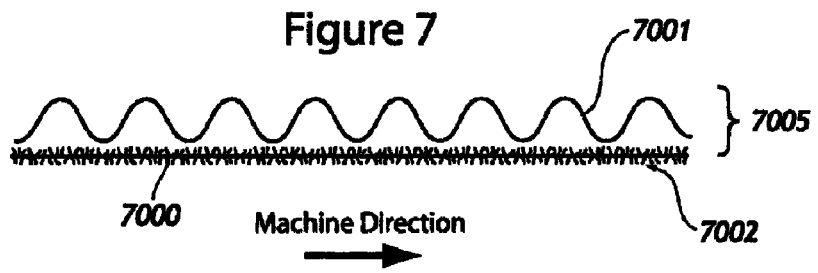
FIG. 7 shows an assembly where one flat element has a relatively nondiscrete surface with protruding fiber elements forming a lower density fuzzy surface.

FIG. 7 shows an exemplary desirable assembly 7005 with one corrugated or sinuous fabric element 7001 having an exterior surface 7000 with a relatively "fuzzy" surface of partially protruding fibers extending in the z-direction 7002.

Figure 8:
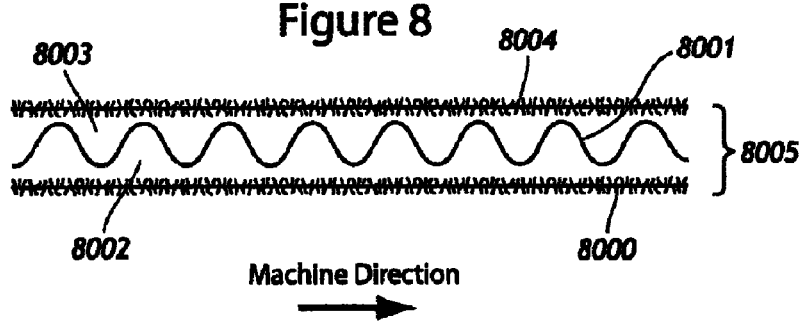
FIG. 8 shows an assembly with two relatively fuzzy surfaced elements and one corrugated element.

FIG. 8 shows an exemplary more complex assembly 8005 of elements 8004 and 8000 with relatively non-discrete and lower density fuzzy surfaces on both interior and exterior surfaces with a sinuous element. The fibers on the surfaces of layer elements 8000 and 8004 partially project into the interior cavities 8002 and 8003. Practitioners skilled in the art would appreciate that the open cavities formed between the sinuous elements in the bonded composite structure may be large or small, distinctly hollow or partially or fully filled as desired by the fizzy intruding fibers, with variable undulating wave wavelength and amplitude, and also combined in many layered assemblies and combinations of elements without departing from the spirit of the invention.

FIGS. 9A-10B show exemplary variations in the z-direction height and the repeating wavelength of sinuous elements which are easily varied by employing aspects of the present invention.

FIG. 9A shows an example of a relatively lower wavelength (higher wave number) corrugated sinuous element 9000 bonded to a relatively flat element 9001 in a composite assembly 9004.

FIG. 9B shows an example of a relatively higher wavelength (lower wave number) corrugated or sinuous element 9002 bonded to a relatively flat element 9003 in a bonded composite assembly 9005.

FIG. 10A shows an example of a relatively higher amplitude corrugation or sinuous element 10000 bonded to a relatively flat element 10001 in a bonded composite assembly 10004.

FIG. 10B shows an example of a relatively lower amplitude corrugation or sinuous element 10002 bonded to a relatively flat element 10003 in a bonded composite assembly 10005.

As illustrated in the process flow diagram of FIG. 11, such assemblies of sinuous elements affixed to relatively flat elements can be made, according to one aspect of the present invention, directly by assembling multi-layer depositions of elements, at least one of which can be made to shrink substantially relative to other elements in the assembly and bond to another element after activation. The entire layered assembly is subjected to a shaping process, such as to form the entire assembly into a three-dimensionally sinuous or corrugated shape. The shaped assembly then passes through an activation step, such as an oven, causing the shrinkable elements to contract into a relatively flat surface while the non-contracting elements remain in the sinuous form and become bonded to the other elements when removed from the activation step.

The ability to easily alter the location, recipe and mass amounts of individual contractive or non-contractive elements within a complex layered assembly is an advantage of the airlaid method of practice of the present invention. Of special advantage is the present invention's ability to accommodate a wide variety of raw materials and forms, such as irregular particles or agglomerates, in blended recipes as long as at least one layered element can be caused to substantially contract relative to the other elements and bond them together in an assembly shaped into some type of raised undulant shape prior to activation by whatever manner is used to cause the shrinking and bonding behavior on demand. Indeed, the use of a wide variety of raw material components capable of being used in the performance of the present invention is specifically contemplated as being desirable.

The invention can be accomplished in many basis weights, forms and combinations as long as at least one layer can be caused to contract relative to the other layers after the assembly is first shaped into some type of z-directionally shaped mound or other wave-like shape. The activation step in whatever form, exploits differences in shrinkage behavior of otherwise similarly shaped layers. The bonding of all individual layers of elements to each other in an activated assembly is generally desirable, but is optional and can be varied, depending on the selection of materials employed, and reduced bonding—or even the absence of bonding—between two or more layers in a unitized composite is specifically contemplated as well.

While the exemplary methods of depositing elements of the layers used herein are airlaid forming methods, a wide variety of assembly methods is specifically contemplated. Further, the specifics of any particular assembly methodology for depositing and layering the elements of an assembly prior to shaping and activation is not limited to the methods described herein nor are the mass amounts and recipes of the individual layer elements used in individual layers.

Independent of the particulars of the machinery and systems used to form airlaid or other assemblies of layers, unitized airlaid structures, according to aspects of this invention, exhibit performance characteristics comparable to, or exceeding, those of products made by other processes, such as those used for laminating of multiple fabrics. Additionally, benefits are achieved by utilizing a unitized airlaid structure because it reduces costs associated with lamination, including costs from converting waste and lost manufacturing efficiency from down time caused by the complexity of the lamination process. It is believed that converting losses of about 5% or more, and perhaps as much as 15% or more, are associated with lamination processes. Also, lamination speeds may be limited by different stretch, neck-in and tensile strengths of the fabrics to be combined. There are also costs associated with the lamination adhesive setup and cleanup. In addition, there may be a reduction in overall loft of the fabric (higher density) in a laminated structure, which may be undesirable. Lamination processes may require the storage of several different roll goods and their associated quality control issues, in addition to using multiple roll goods vendors, and the cost of shipping, delivering, testing and certifying the roll goods. Also, each fabric incorporates its own material waste problems as a result of its own manufacturing process.

Practitioners skilled in the art can also appreciate that it is possible to use just one chemistry type and material form to design a product that will perform according to the present invention. For example, even with the same fiber chemistry used for the different elements, differences in heat setting treatments and fiber drawing parameters used during the fiber making process for manufacture of otherwise similar loose fibers or in-situ deposited elements can be exploited to produce relative differences in shrinkage behavior of individual elements in a layered assembly when activated. Exemplary structures can also be made from contractive materials layered with other layers containing the same contractive materials used in relatively non-contractive layers by substantial dilution with non-contractive materials. A sufficient weight concentration percentage of the layer recipe can be included such that the diluted layer material does not substantially contract relative to the higher concentration contractive layers during activation. By using an airlaid process for depositing various recipes (i.e., types and mass) of fibrous elements, at least one of which is thermoplastic, according to aspects of this invention, it is possible to achieve a variety of contractive properties, strength characteristics, surface textures and densities of the individual layers of an assembly based on selection of fibers; details of the weaving patterns of porous forming, transfer and oven wires; oven settings; additives; and compression strategies used in the layer assembly process prior to activation of the contractive behavior of shrinkable layers.

By employing plural forming heads and separate fiber feeds using the airlaid forming process example, maximum flexibility is provided and rapid changes can more easily be made during manufacture.

For example, the composite may have a basis weight of binder fibers in a first zone and a different basis weight of fibers in another zone and can be different in any or all of the layers assembled. The concentration by weight of contractive and non-contractive elements in each layer is selected depending on the desired contractive behavior, surface texture, strength and performance characteristics of the unitized composite desired. The mass of material deposited in each layer, as well as the recipe and characteristics of the materials used, is optionally adjusted over a wide range to accommodate functional demands of the finished unitized composite and other design, cost or processing considerations.

Protruding surface fibers in the z-direction, can be provided with unique characteristics as compared to the other regions of the unitized composite by supplying the forming heads in the airlaid process with tailored amounts of materials for each layer; among the useable variables are fiber denier, crimp, shape and chemical composition. Those layers are optionally adjusted individually for desired density during assembly with compression rolls, which also affects behavior in the activation step.

Additionally, more expensive fiber layers can be positioned adjacent to less expensive ingredients concealed in other layers, and properties of the individual layers of an assembly can be selected according to the end-use property requirements, often using a lesser amount of materials to provide equivalent or superior functionality in the finished composite compared to separately made and subsequently combined structures made with corrugation and lamination methods.

Referring now to FIGS. 12 through 22, schematic representations are provided for exemplary systems that can be used to form a unitized airlaid composite according to aspects of this invention.

Specifically, FIGS. 12 through 22 provide schematic side views of exemplary webs and complimentary web-forming systems in such a way as to show how zones of unitized airlaid layers build up on top of each other while moving through respective web-forming systems. The zones of the exemplary webs are not depicted to any particular proportion or scale, but are instead shown schematically for purposes of illustration only. Also, because of some mixing and blending of fibers between the zones of a unitized airlaid structure that occurs during the web-forming process, the zones are not always perfectly distinct as depicted in the figures.

Generally, each of the web-forming systems illustrated in FIGS. 12 through 22 shows a machine having a conveyor surface, including a porous wire screen, on which the web of the airlaid composite is formed. Fiber-introducing heads are positioned above the wire screen in order to deliver components of the airlaid composite to the screen in a controlled manner. The fiber-introducing heads are configured to introduce the same or different fibers in any combination, as depicted schematically in FIGS. 12 through 22 by cross-hatching. For example, two or more (or all) of the heads can introduce the same fibers or fiber mixture, or all or some of the heads can introduce different fibers or fiber mixtures. Rolls are also provided in order to selectively modify the web as it passes through the system. The schematic representation of the resulting web of the unitized airlaid composite (juxtaposed below the machine in each of FIGS. 12 through 22) shows the web portions provided by each of the heads as those portions build to form the web of the unitized airlaid composite along the machine direction (MD). Again, the web portions are integrated in actual airlaid systems as opposed to the distinct zones depicted schematically in FIGS. 12 through 22 for purposes of illustration.

Figure 12:
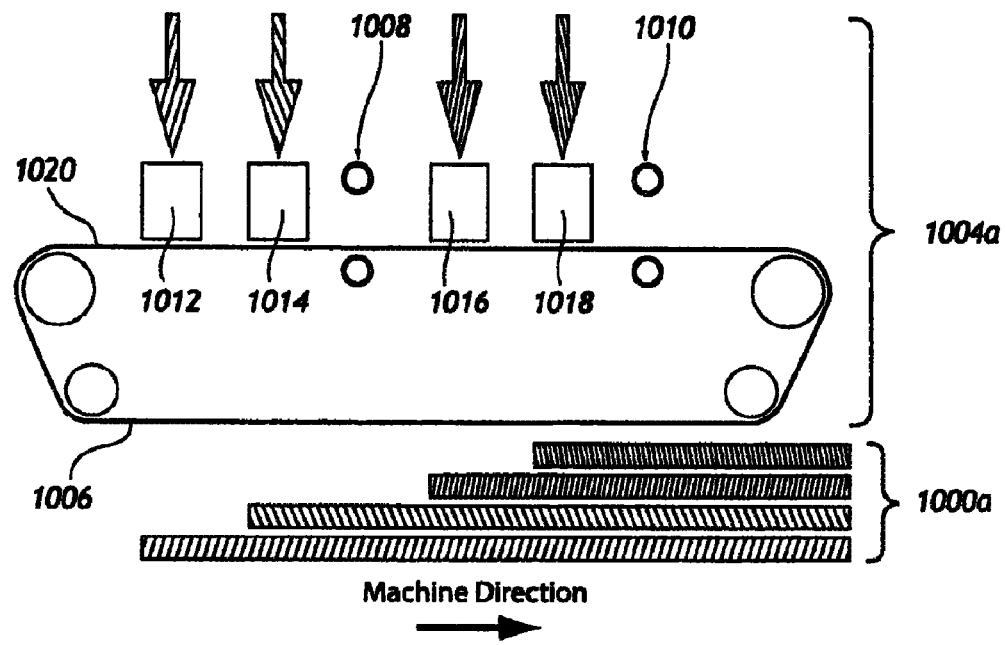
FIGS. 12-18 show airlaid assemblies of loose fiber layers which are optionally compressed.
Figure 13:
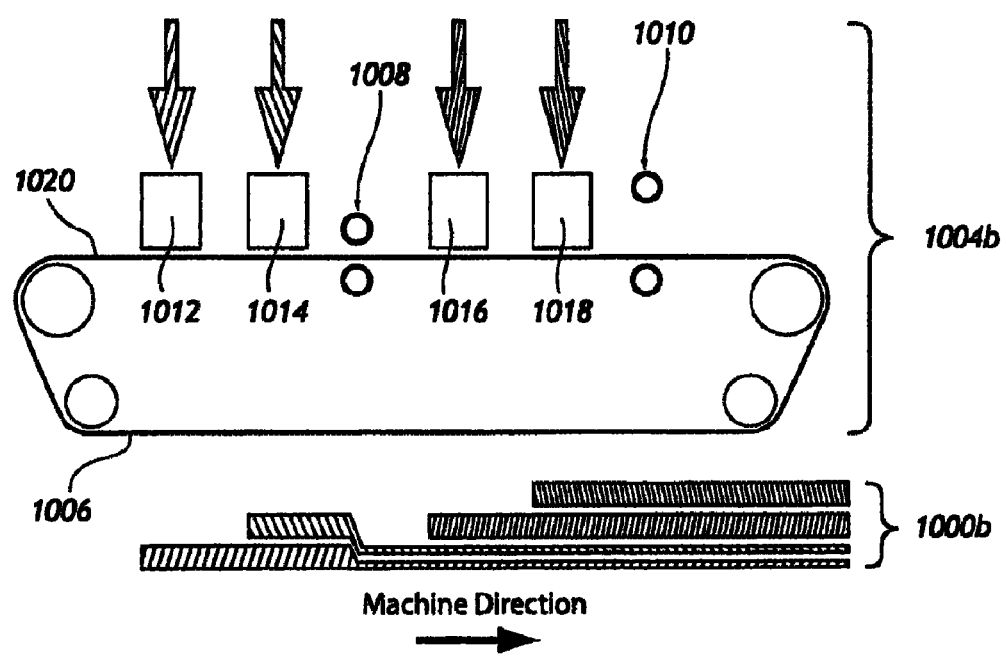

Referring specifically to FIG. 12, one exemplary system utilizes a machine 1004*a* to form a web of an airlaid composite 1000*a* The machine 1004*a* includes a conveyor mechanism 1006 that supports a wire screen 1020 on which the components of the airlaid composites are deposited. A pair of upstream rolls 1008 and another pair of downstream rolls 1010 are provided in such a way that the wire screen 1020 passes between each pair of rolls 1008 and 1010. Plural heads are provided above the wire screen 1020 along the length of the machine 1004*a*. Specifically, machine 1004*a* includes four (4) heads, including a first head 1012, a second head 1014, a third head 1016, and a fourth head 1018. First and second heads 1012 and 1014 are positioned upstream from the upstream rolls 1008, and third and fourth heads 1016, 1018 are positioned downstream from upstream rolls 1008 and upstream from downstream rolls 1010. The upstream and downstream rolls 1008 and 1010 are optionally utilized as compression rolls, and the gap between the rolls in 1008 and between the rolls in 1010 is adjustable as will become clear in connection with the description of FIGS. 13 through 22. The machine 1004a illustrated in FIG. 13 is a 4-head airlaid machine shown to have heads 1012, 1014, 1016 and 1018 feeding substantially equal amounts of the same fiber composition. Alternatively, one or more of heads 1012, 1014, 1016 and 1018 optionally feed substantially different amounts of fibers or feed substantially different fibers or fiber compositions. As illustrated in FIG. 12, the machine 1004a does not utilize upstream and downstream rolls 1008 and 1010 as compression rolls (i.e., the gap between the rolls of 1008 and of 1010 are maintained so as to eliminate or minimize compression of the web passing between them). Accordingly, the machine 1004a is configured to yield a relatively thick fabric having a relatively low density.

Referring now to FIG. 13, the exemplary system shown includes a machine 1004b used to form a web 1000b. The machine 1004b is configured to utilize the upstream rolls 1008 as compression rolls while the downstream rolls 1010 are not so utilized. Accordingly, the machine 1004b is configured to form a variable density fabric because the zones introduced by first and second heads 1012 and 1014 are compressed by upstream rolls 1008, thereby increasing the density of those zones, while the zones deposited by third and fourth heads 1016 and 1018 are not densified because the downstream rolls 1010 are spaced so as to minimize or eliminate any compression of the zones deposited by those heads 1016 and 1018.

Figure 14:
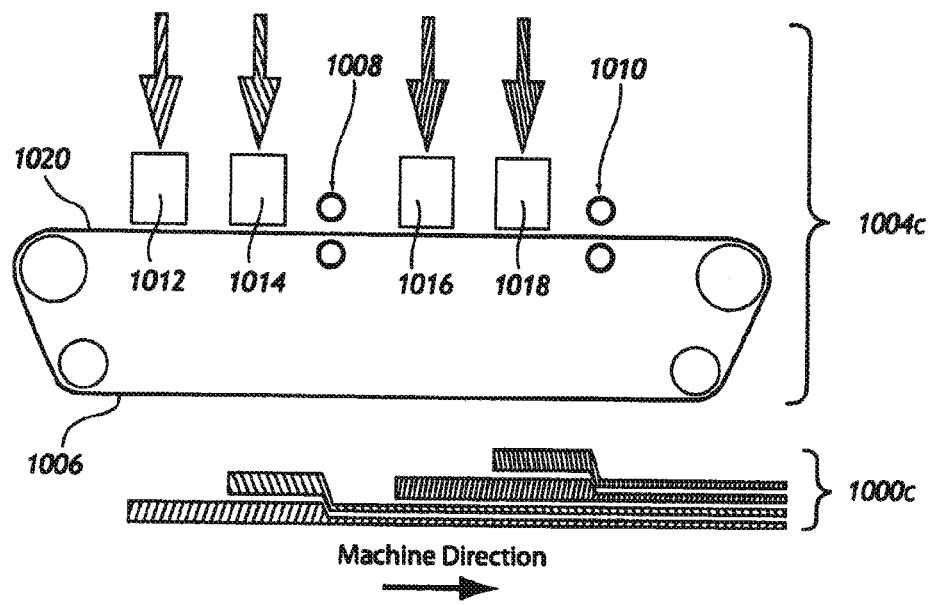

Referring next to FIG. 14, the illustrated system includes a machine 1004c used to form a unitized airlaid web 1000c. In this system, both the upstream rolls 1008 and downstream rolls 1010 are utilized as compression rolls, thereby yielding a thinned web of fabric having a relatively high density.

Figure 15:
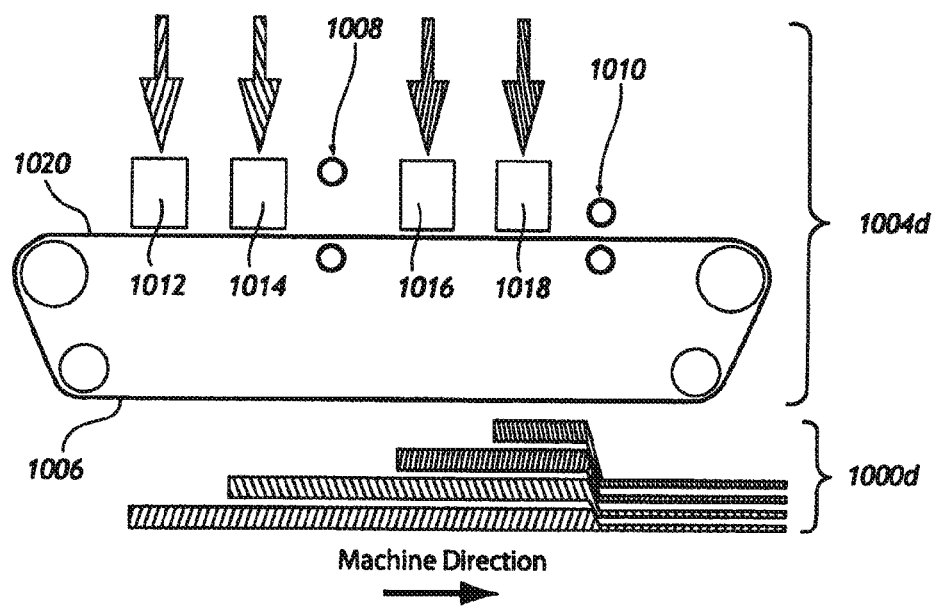

Referring now to FIG. 15, which illustrates a machine 1004d used to form a web 1000d, only the downstream rolls 1010 are utilized as compression rolls (upstream rolls 1008 are not so utilized). Accordingly, machine 1004d provides for an overall compression of the web, thereby yielding a thinned fabric of relatively high density, similar in respects to the web 1000c formed according to the system illustrated in FIG. 14.

Figure 16:
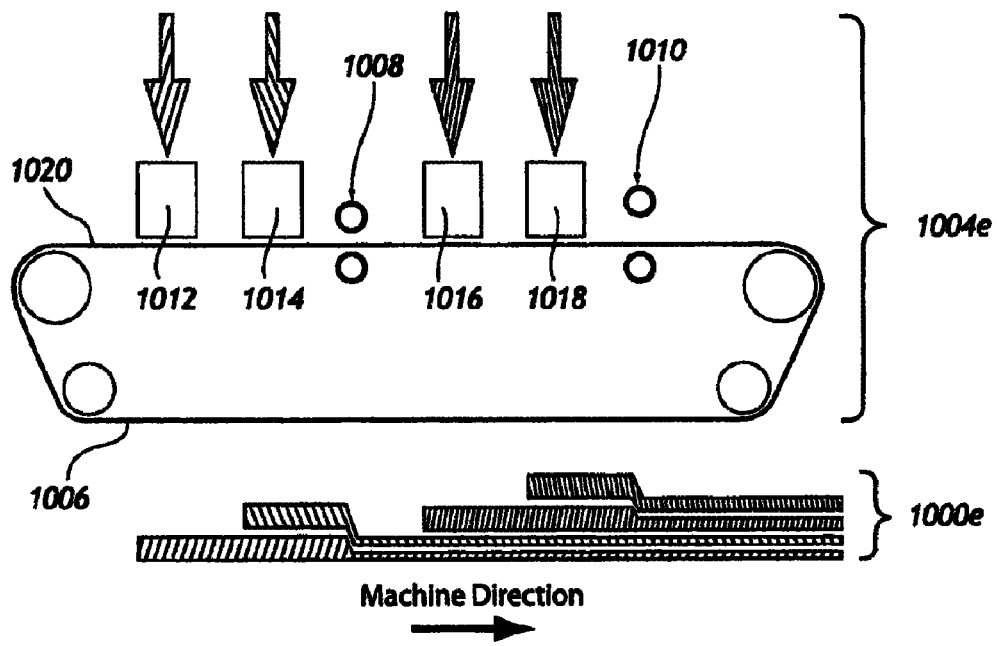

Referring now to FIG. 16, a machine 1004e is used to form a web 1010e. Machine 1004e utilizes both the upstream rolls 1008 and the downstream rolls 1010 as compression rolls but with varying degrees of compression. More specifically, upstream rolls 1008 are utilized as compression rolls while downstream rolls 1010 are provided for partial compression. Accordingly, machine 1004e yields a gradient density web (as illustrated schematically by the relative thicknesses of the zones of the web 1000e), but the web 1000e differs from the web 1000b shown in FIG. 13 and the web 1000c shown in FIG. 14 with respect to the thickness and densities of zones in the web 1000e (e.g., the top two zones of the respective webs are thicker and will typically have a lower density).

Figure 17:
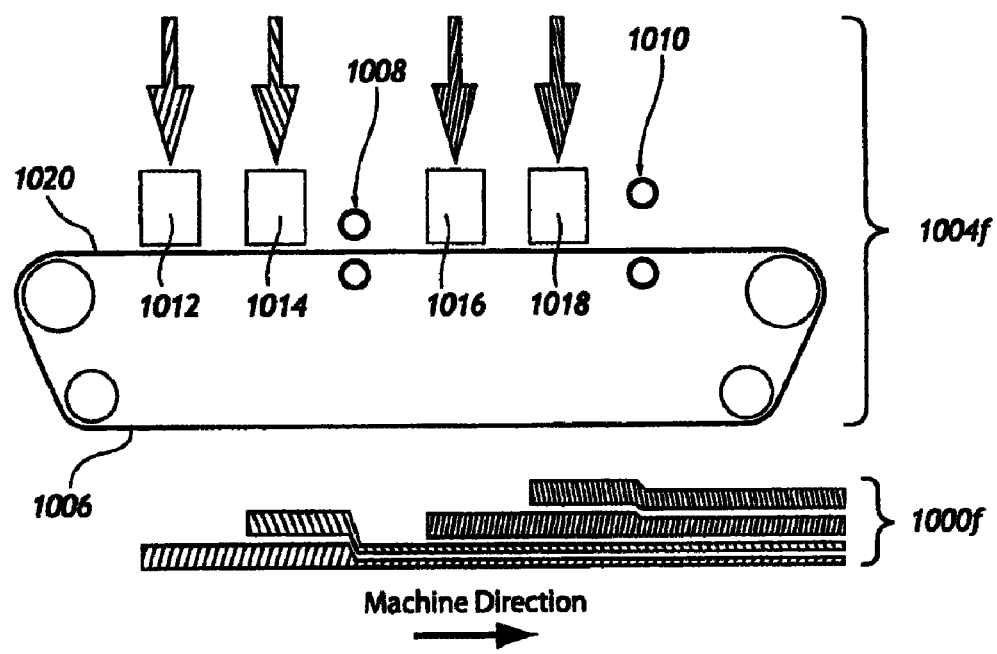

Referring to FIG. 17, a machine 1004f forms a web 1000f that is similar to the web 1000e illustrated in FIG. 16. Web 1000f differs from web 1000e in the degree of compression provided by downstream rolls 1010, thereby yielding thicker zones of material deposited via the third and fourth heads 1016 and 1018.

Figure 18:
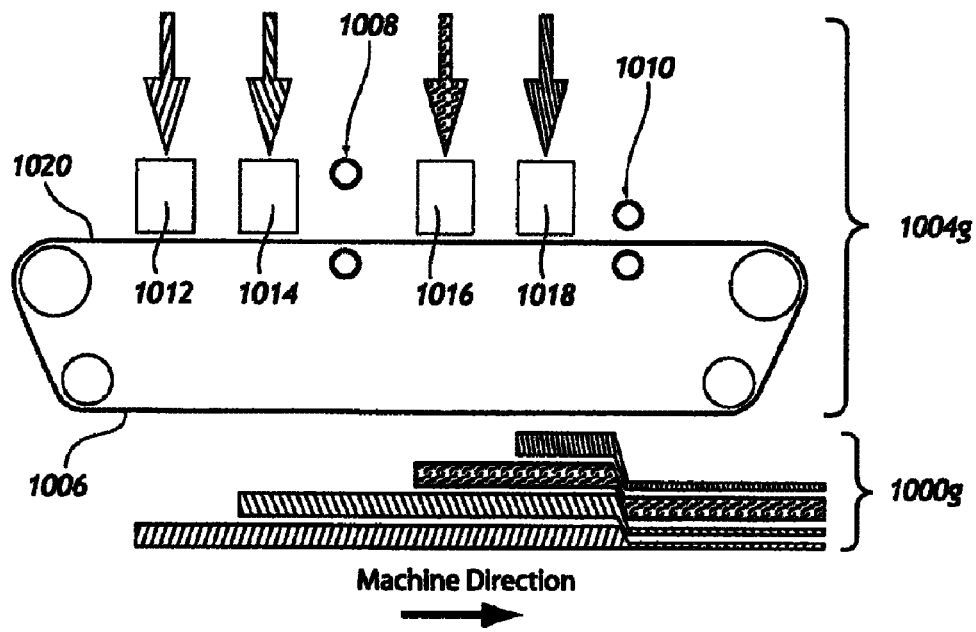

Referring now to FIG. 18, a machine 1004g yields a web 1000g. The system illustrated in FIG. 18 is similar to that illustrated in FIG. 15, except that a resilient fiber is introduced through one of the heads. Specifically, a resilient fiber is introduced to the web via the third head 1016, wherein the fiber introduced via head 1016 differs from that introduced via heads 1012, 1014, and 1018, at least in terms of its resiliency. Because of the resiliency of the fiber introduced through the third head 1016, the zone thus produced tends to "bounce back" to or toward its original shape after passing through downstream rolls 1010, thereby yielding a more bulky and lower density central zone surrounded by substantially thinner zones. Such a zone is optionally provided at any location across the thickness of the web, including top and bottom zones of the web. Skilled practioners will recognize that the individual elements used in the layers are not required to be loose fiber assemblies and that many shapes and form factors of materials can be accommodated by the airlaid forming process.

FIGS. 19 through 22 illustrate the assembly of systems that differ from those illustrated in FIGS. 12 through 18 in that one or more separate raw material components are optionally introduced into the assembly process. The separate component is optionally a pre-formed web of material such as a nonwoven. Preferably, the separate component is formed in-situ in combination with the airlaying process to reduce manufacturing costs.

Figure 19:
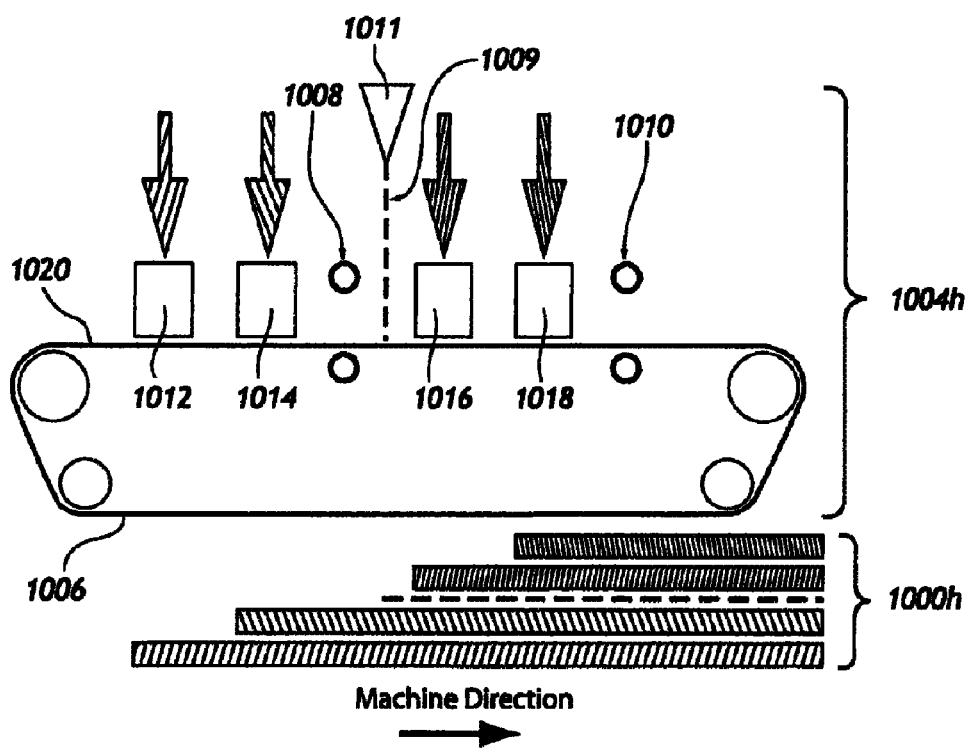
FIGS. 19 through 22 show airlaid assemblies of loose fiber layers with layers of in situ produced nonwoven elements which are optionally compressed.

Referring to FIG. 19, a machine 1004h is used to form a web 1000h that includes a web of material between adjacent zones of the web 1000h formed through the second and third heads 1014 and 1016. More specifically, a supplemental head 1011 is provided in machine 1004h to introduce a material 1009 at a location between the second head 1014 and third head 1016, thereby interposing the web material between the zones of the web 1000h formed by the second head 1014 and third head 1016. Accordingly, the resulting web 1000h is similar to the web 1000a formed by the machine 1004a (FIG. 12), except that an additional web material 1009 has been introduced into the web 1000h between zones of the web 1000h.

Figure 20:
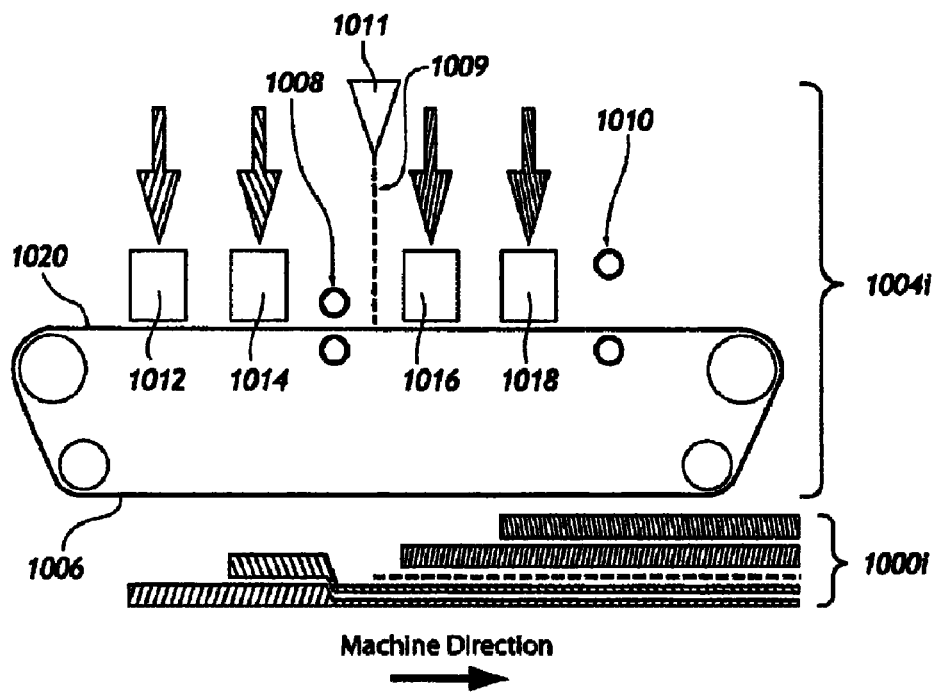

Referring to FIG. 20, a machine 1004i produces a web 1000i. Web 1000i is similar to web 1000b (FIG. 13), in that the upstream rolls 1008 are utilized as compression rolls to compress the first two zones deposited by means of first head 1012 and second head 1014. Web 1000i is also similar to web 1000h (FIG. 19) in that separate web material 1009 is introduced via supplemental head 1011 between the zones deposited by the second and third heads 1014 and 1016.

Figure 21:
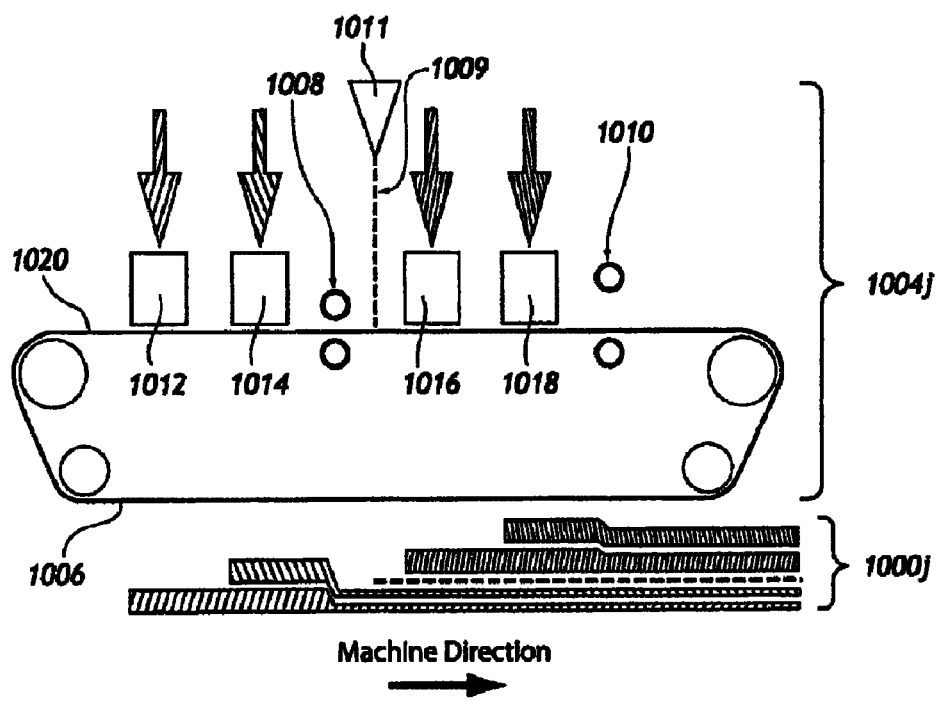

Referring to FIG. 21, a machine 1004j is used to form a web 1000j. Web 1000j is similar to web 100f (FIG. 17) in terms of compression ratios and similar to web 1000h (FIG. 19) in terms of the introduction of a separate web material 1009 via supplemental head 1011.

Figure 22:
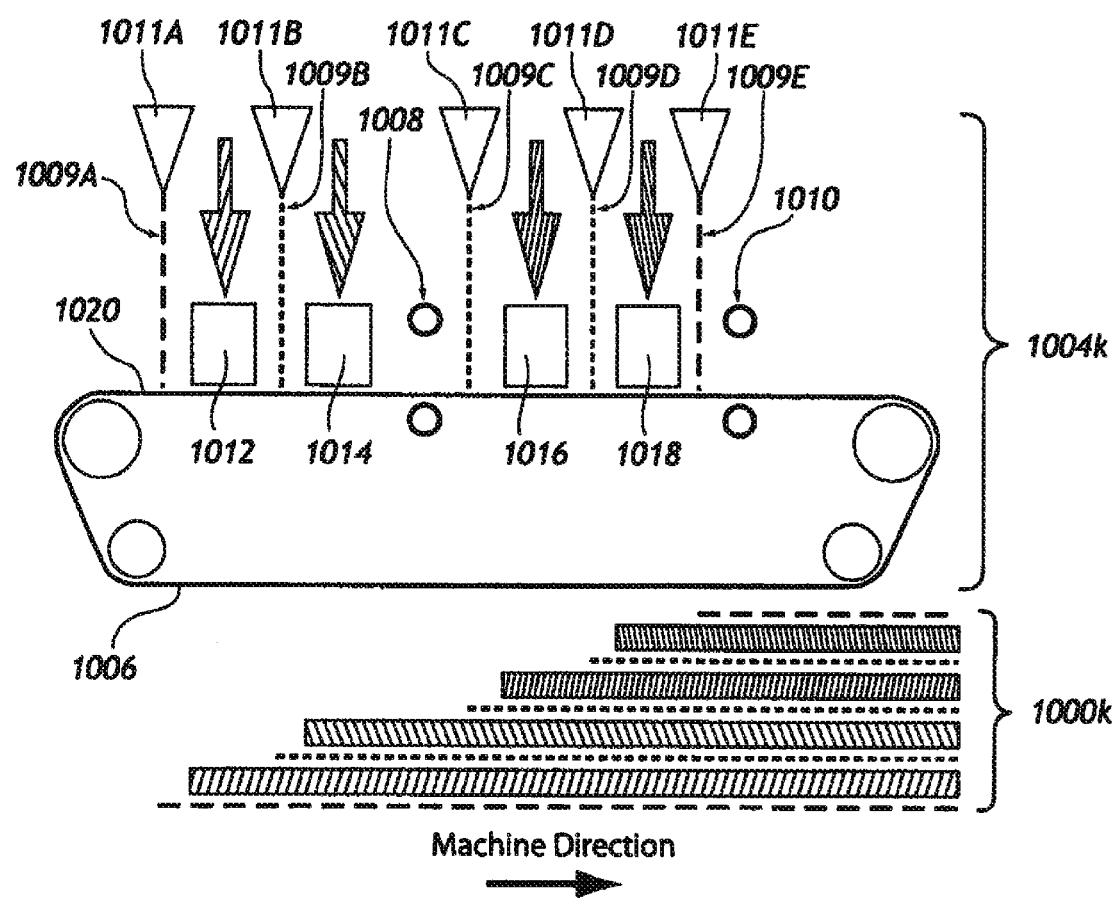

Referring now to FIG. 22, a machine 1004k is used to form a web 1000k. The schematic illustration provided in FIG. 22 demonstrates that multiple components (the same or different components) can be provided via heads 1011A-1011E positioned between the airlaid forming heads. For example, heads can be provided for the introduction of web materials 1009A-1009E (e.g., spunbonded, spunmelt or meltblown materials or films) at one or any combination of locations upstream and downstream of the heads 1012, 1014, 1016 and 1018. In machine 1004k, such supplemental heads 1011A-1011E are provided upstream of first head 1012, between first head 1012 and second head 1014, between second head 1014 and third head 1016, between third head 1016 and fourth head 1018 and downstream from fourth head 1018 and upstream of downstream rolls 1010. Any combination of such supplemental heads can be utilized, and such heads can be used to introduce the same or different components in any combination. Also, although not shown in FIG. 22, the upstream rolls 1008 and downstream rolls 1010 can be utilized in any combination as compression rolls in order to compress selected zones of the resulting web 1000k. It is also contemplated that an article is optionally produced by forming a unitized airlaid composite directly onto a roll good substrate, for example by forming a unitized airlaid composite directly onto a porous substrate such as a light weight spunbond web or other suitable substrate.

Additional functionality is provided to the unitized airlaid structure by using another advantage of unitized airlaid webs, which is the substantially non-directional nature of the webs produced, where tensile strength and other such physical properties are approximately the same in the machine direction MD and cross direction CD. This is not the case, for example, with paper or with many types of nonwovens produced by such processes as carding or spunbonding, which tend to produce webs which show substantially higher MD versus CD directionality in strength and structural load bearing behavior.

Accordingly, combined structures—whether produced by lamination or unitized composite techniques—made with such directional alternatives would require higher amounts of material to provide adequate strength in both the MD and CD (x and y) directions. Although a unitized airlaid system exhibits advantages as compared to such other forming systems and structures, such other systems (including lamination) are within the scope of this invention, especially when used in conjunction with airlaid systems. It is recognized that some materials (e.g., spunbond webs) are ubiquitous and inexpensive, both as separately produced roll goods and as web elements made in-situ during the manufacture of the other fibrous or unwound roll good assemblies incorporated simultaneously with the airlaying process. Accordingly, such materials may be beneficially used, preferably in conjunction with airlaid fibrous materials and optionally with the addition of particulate materials into the unitized composite structures.

Exemplary airlaid machinery suitable for airlaying and practice of the present invention is available for use at Marketing Technology Service, Inc. of Kalamazoo Mich., or through Neumag Denmark A/S of Horstens, Denmark or through Dan-Web A/S of Aarhus, Denmark.

Figure 24A:
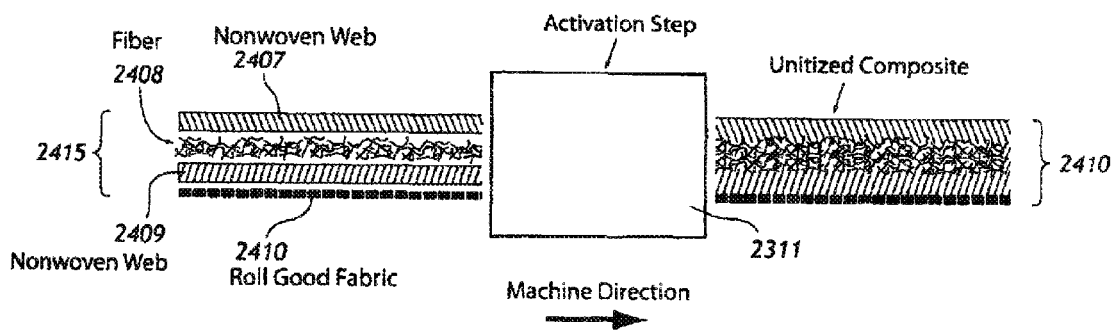
FIG. 24A shows loose fiber layers and nonwoven process layers and a roll good fabric bonded into a unitized composite.
Figure 24B:
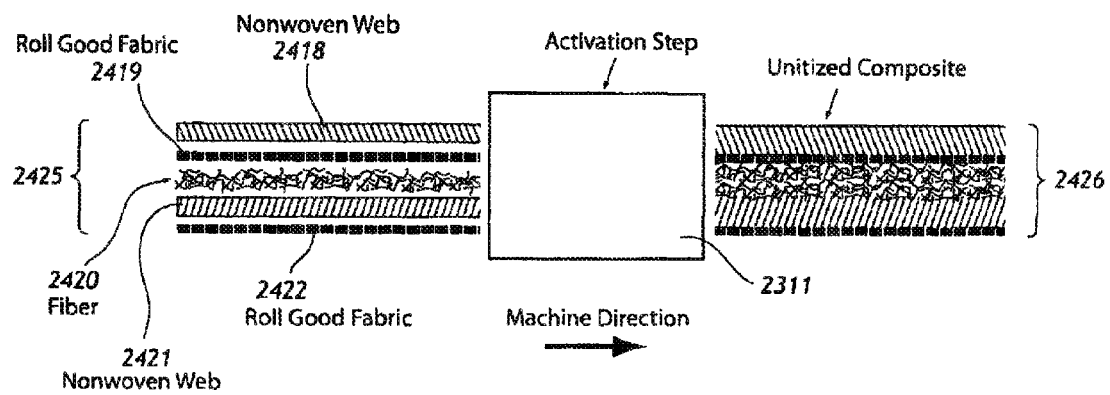
FIG. 24B shows loose fiber layers, nonwoven process layers, and previously made roll good fabrics which are assembled and then bonded into a unitized composite.
Figure 24C:
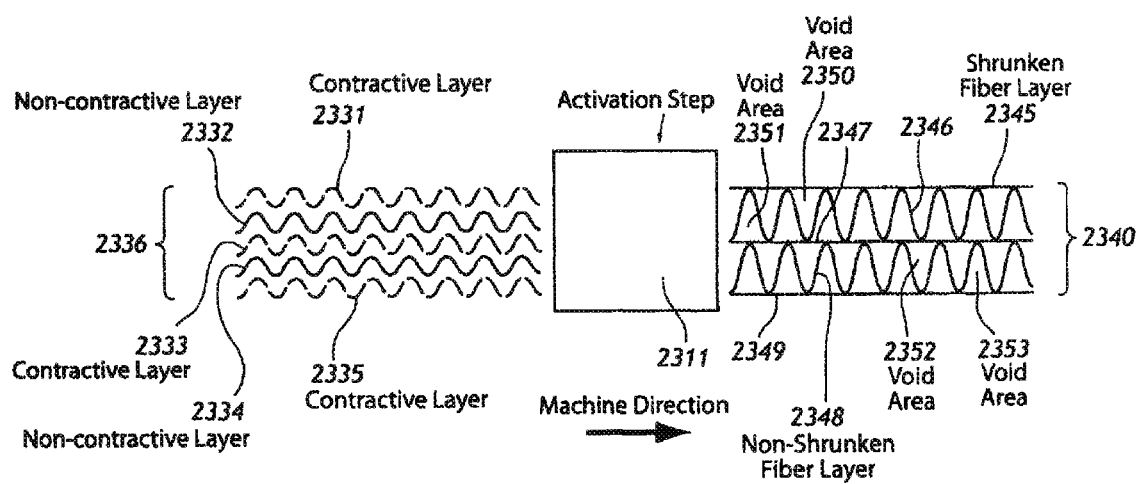
FIG. 24C shows contractive and non-contractive layers with an activation step resulting in the contractive elements shrinking into relatively flat surfaces while the non-contractive elements remain in an un-shrunken sinuous state.

FIGS. 23A-B and 24A-B depict unitized composites made without shrinkable elements which are relatively flat, and FIG. 24C shows an assembly with shrinkable elements.

FIG. 23A shows an exemplary assembly of loose fiber layers 2310 assembled on top of each other and then bonded together into a single unitized composite 2312 in an oven or other activation step 2311.

FIG. 23B shows an exemplary assembly of loose fiber layers 2307, 2309 and direct process nonwoven layers 2315, 2316 made at the same time and assembled on top of each other, and then bonded together into a single unitized composite 2318 in an oven or other activation step 2311.

FIG. 24A shows an assembly 2415 of loose fiber layer 2408 and nonwoven process layer elements 2407, 2409 made at the same time, with a previously made roll good fabric 2410 assembled on top of each other and subsequently bonded in an oven or other activation step 2311 into a single unitized composite 2410.

FIG. 24B shows an assembly 2425 of a loose fiber layer 2420, with nonwoven process layers 2418, 2421 made at the same time, along with previously made roll good fabrics 2419, 2422 all assembled on top of each other and subsequently bonded in an oven or other activation step 2311 into a single unitized composite 2426.

FIG. 24C shows a shaped sinuous or wavy assembly 2336 of contractive layers 2331, 2333, 2335 and relatively non-contractive layer elements 2332, 2334 previously assembled on top of each other, which are then activated and bonded together into a single unitized composite 2340 in an oven or other activation step 2311, resulting in the contractive elements shrinking into relatively flat surfaces 2345, 2347, 2349 while the non-contractive elements 2346, 2348 remain in an un-shrunken corrugated or sinuous shape affixed to the flat-surfaced elements 2345, 2347 and 2349 when removed from the activation step.

There are many possibilities using known technologies to shape the un-bonded layer assemblies into a raised wave-like or undulant shaping prior to the activation of the desired shrinkage behavior of the assembled elements according to this invention. Practitioners skilled in the art would also recognize that the undulant elements do not have to be particularly uniform in shape, amplitude or wavelength to form at least somewhat orderly sinuous shapes in a unitized composite assembly.

FIG. 24C also shows void areas 2350, 2351, 2352, and 2353. Depending on materials used, these void areas may be crowded with fiber protrusions from the surface of the flat layer, or the sinuous layer, or both. The void areas may also collapse or partially collapse for many reasons, and are specifically contemplated.

Figure 25:
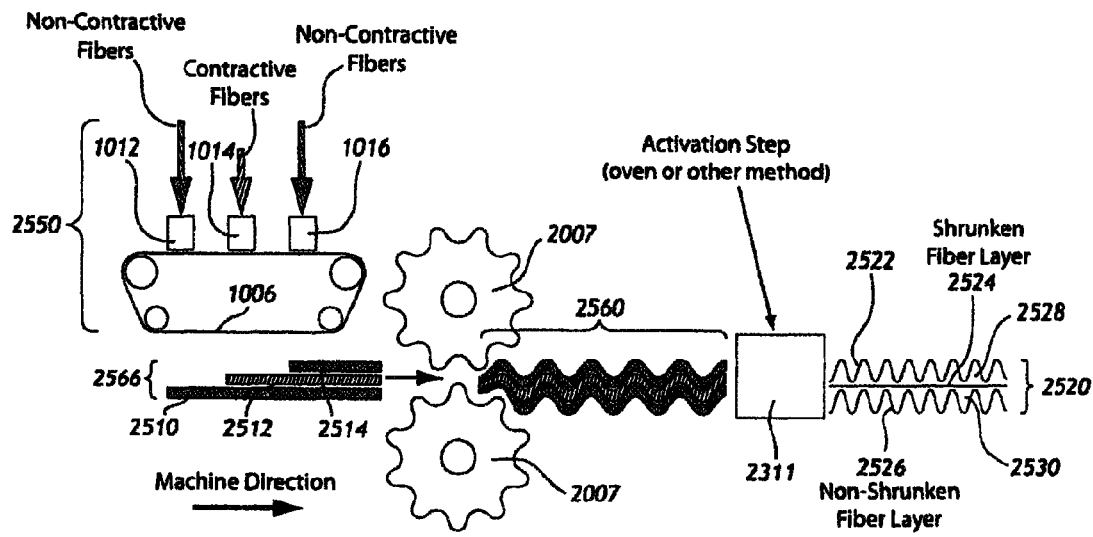
FIG. 25 shows an airlaid process assembling loose fiber contractive material with two non-contractive layers which are shaped with corrugation rolls and activated.

FIG. 25 shows another example embodiment according to the present invention showing an assembly of layers of a loose fiber contractive element 2512 with two non-contractive layers 2510, 2514 of loose fibers assembled on top of each other using airlaid forming section 2550, subsequently corrugated into a sinuous shape using corrugation rolls 2007 and subsequently bonded in an oven or other activation step 2311. The assembly becomes bonded into a single unitized composite 2520 where the contractive element 2524 shrinks into a relatively flat surface in the interior of the unitized bonded composite 2520 and the two non-contractive elements 2522, 2526 remain in substantially un-shrunken corrugated shapes which are bonded to the relatively flat-surfaced shrunken element 2524 forming cavities 2528, 2530.

Figure 26:
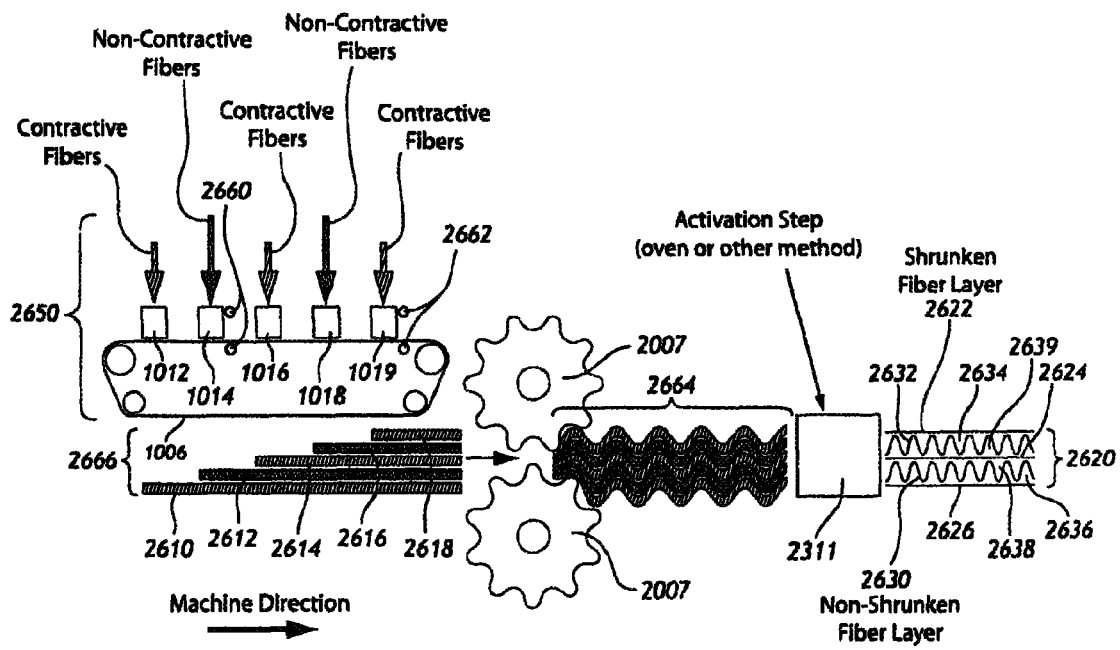
FIG. 26 shows another airlaid process assembling loose fiber contractive and non-contractive layer elements, with the overall assembly shaped into a sinuous form followed by activation.

FIG. 26 shows a more complex exemplary method for airlaid forming of loose fiber assemblies of contractive elements 2610, 2614, 2618 and non-contractive elements 2612, 2616 using airlaid forming section 2650 with the overall assembly corrugated into a sinuous form using corrugation rolls 2007 followed by an oven 2311 or other activation step, causing the contractive elements 2610, 2614, 2618 to shrink relative to the non-contractive elements 2612, 2616 resulting in a bonded unitized composite 2620 of relatively flat shrunken layers 2622, 2624, 2626 attached to still sinuous and un-shrunken elements 2632, 2630 forming cavities 2634, 2636, 2638, 2639.

Practitioners skilled in the art will further recognize that the present invention may optionally include layer elements produced in-situ such as by the extrusion of thermoplastic or non-thermoplastic materials in fibrous or other forms and also, optionally, could include incorporation of previously made roll good elements without departing from the spirit of this invention.

FIG. 27 shows an exemplary airlaid forming method depositing non-contractive loose fibers 2712, 2716 using airlaid forming section 2750 and also depositing relatively contractive direct process nonwoven elements 2710, 2714, 2718 with the overall assembly of layers being formed into a sinuous structure using corrugation rolls 2007 followed by an oven or activation stage 2311 causing the contractive elements 2722, 2724, 2726 to shrink relative to the non-contractive elements 2732, 2730 resulting in a bonded composite 2720 of relatively flat shrunken layers 2722, 2724, 2726 attached to still sinuous and un-shrunken elements 2732, 2730 forming cavities 2728, 2739, 2736, 2738.

FIG. 28 shows another exemplary method for airlaid forming of loose assemblies of non-contractive layers 2812, 2816 of loose fibers with previously made contractive roll goods 2810, 2814, 2818 with the overall assembly being first formed into a sinuous shape followed by an oven or activation stage 2311 causing the contractive elements to shrink relative to the non-contractive elements, resulting in a bonded composite 2820 of relatively flat shrunken layers 2822, 2824, 2826 attached to still sinuous and un-shrunken elements 2830, 2832.

FIG. 29 shows one exemplary method of corrugating or shaping an assembly 2966 of elements into a sinuous structure using a patterned roll 2970 with a recessed surface feature and a compression roll 2980 to form a three-dimensional shaping optionally similar to that made by corrugation rolls. The patterned roll 2970 can optionally employ raised surface features rather than recessed shaping features and can optionally employ suction zone 2071 to further enhance the patterning imparted to the assembly 2920.

Practitioners skilled in the art will recognize that there are many ways to impart a desirable undulant corrugation to an assembly and that such shaping can vary in not only the z-direction, but also in the x- and y-directions. For example, many such patterns and specific raised shapes can be imparted to the assembly with either raised or lowered patterns on rolls, belts, wires or other devices meant to impart an image of such shaping to the assembly, and such raised or lowered patterns can be continuous or irregular in the x, y, and z directions without departing from the spirit of the invention disclosed herein. Further, the top and bottom surfaces of the resulting shaped assembly 2920 are not required to resemble each other in pattern or texture, or to be the same on the top or bottom of the unitized composite produced, or to be patterned to produce continuous wave shaping in the cross machine direction.

FIG. 30 shows another method of shaping the assembly into a sinuous, relatively distinctly folded structure using pleating techniques 3030 to form three-dimensional wave-like shapes 3020 generally similar to sinuous structures which can be made by corrugation rolls.

FIG. 31A shows another method for manufacturing an irregular three-dimensional raised structure, made by using creping techniques such as those commonly used in the production of tissue papers. An assembly 3166 is adhered to a drier 3172 using a pressure roll 3170. A creping blade 3154 causes the web to buckle into a three-dimensional wave-like shape 3160, followed by a slower moving take-up roll 3155, which preserves the three-dimensional shaping of the creped assembly.

FIGS. 31B-C show other methods of imparting a three-dimensional raised structure 3198 by using Micrex® micro-creping processes used in paper and nonwovens industries for imparting z direction wave-like shaping and softness to fabric assemblies. Generally, Micrexing® techniques and other similar processes depend on differential acceleration of the web between two or more moving or stationary surfaces, rolls or belts moving at different—generally slower—speeds followed by a slower moving take-up winder, which preserves the three-dimensional shaping of the assembly. Such known techniques for producing micro-creping are also suitable for shaping the assembly for practice of the present invention.

FIGS. 32A-D illustrate practice of one preferred method according to the present invention for shaping the airlaid layered assembly prior to the activation step, using a raised transport wire device such as is offered for sale by Dan-Web A/S of Aarhus, Denmark. The transfer device functions by employing a suction box 3264 to provide vacuum through a moving porous wire belt 3210 closely synchronized in speed to both the oven wire 3259 and the forming wire 1006. The function of the transfer device in normal operation is to lift the fragile loose fiber assembly from the forming section wire and then deposit the assembly—intact—onto the oven wire where subsequent activation and bonding will occur.

In normal operation of the airlaying technique, the transfer device wire 3210 is raised only slightly above the plane of the oven wire 3259 to a height approximately equal to the thickness of the loose fiber assembly, and both the transfer wire and oven wire travel at very similar speeds, producing a flat unitized composite fabric, typical of industry practice, after activation and bonding in an oven. According to one aspect of the present invention, by raising the height of the transfer device wire 3210 substantially higher in the z-direction compared to the oven wire 3259, and by substantially slowing down the speed of the oven wire relative to the transfer device wire, the material in the assembly is caused to pile up into a wave-like corrugated shaping. A further benefit of this technique is the immediate and simple adjustments to produce the desired amplitude and wavenumber or wavelength imparted to the assembly by adjusting the transfer height and the speed of the transfer device relative to the oven wire speed using simple machine control software settings.

Figure 32A:
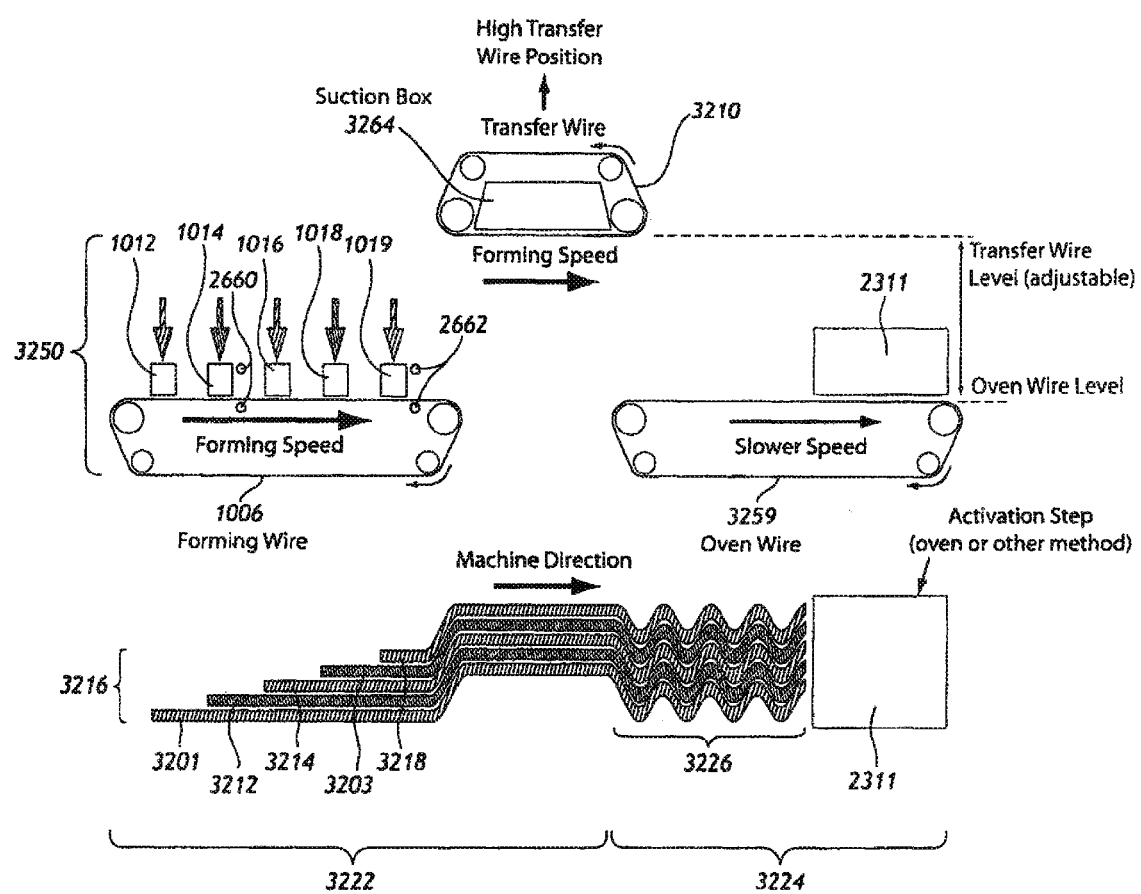
FIGS. 32A-32D show methods of forming a unitized composite made by depositing loose assemblies of contractive and non-contractive layers which are shaped into sinuous structures using a transfer wire device that is raised in the z direction relative to the forming oven wire which is moving at a lower speed than the transfer wire to impart a sinuous shaping to the assembly.

FIG. 32A shows a preferred exemplary method of forming of a unitized composite made by depositing loose assemblies of layers 3216, with the overall assembly being formed into a sinuous structure 3226 using a transfer wire 3210 raised in the z-direction relative to the plane of the oven wire 3259, and which is moving at a lower speed than the transfer wire 3210 to impart three-dimensional wave-like shaping of the desired amplitude to the assembly of elements.

Figure 32B:
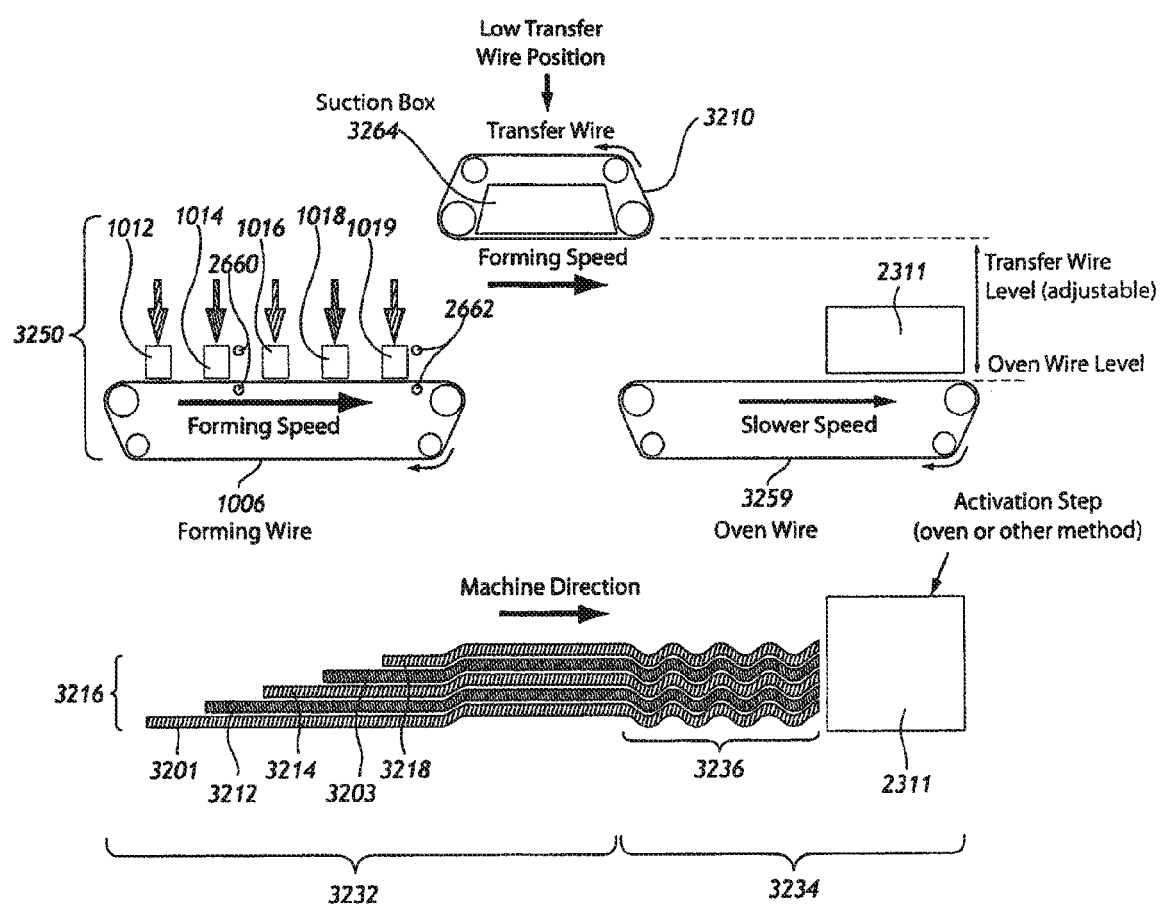

FIG. 32B shows an exemplary method of forming of a unitized composite made by depositing loose fiber assemblies, with the overall assembly being formed into a sinuous structure 3236 of lower amplitude compared to 3226 of FIG. 32A, using a transfer wire 3210 which is raised relatively less in the z direction compared to FIG. 32A.

Figure 32C:
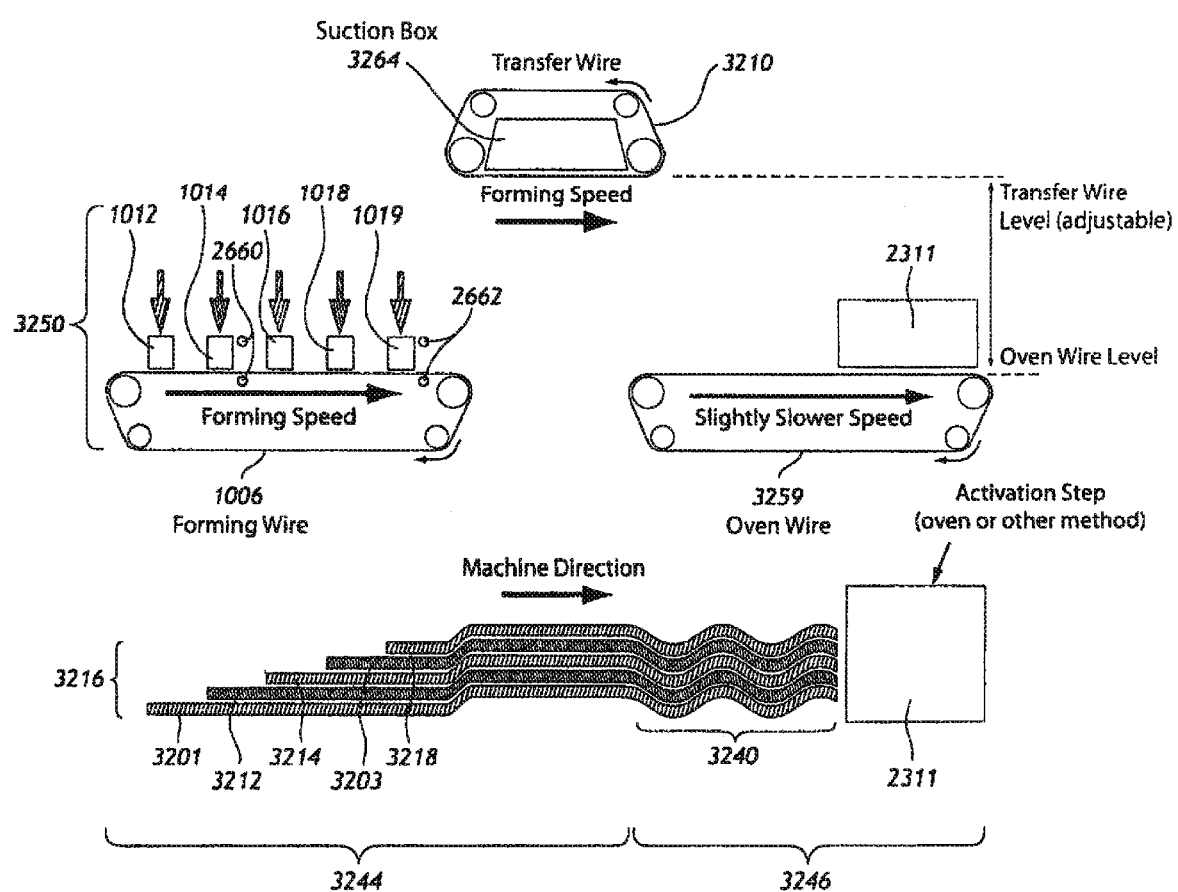

FIG. 32C shows an exemplary method of forming of a unitized composite made by depositing loose fiber assemblies, with the overall assembly being formed into a wave-like structure 3240 of lower frequency compared to 3226 of FIG. 32A, using an oven wire 3259 which is moving faster than the oven wire 3259 in FIG. 32A, while still moving slower than the transfer wire 3210.

Figure 32D:
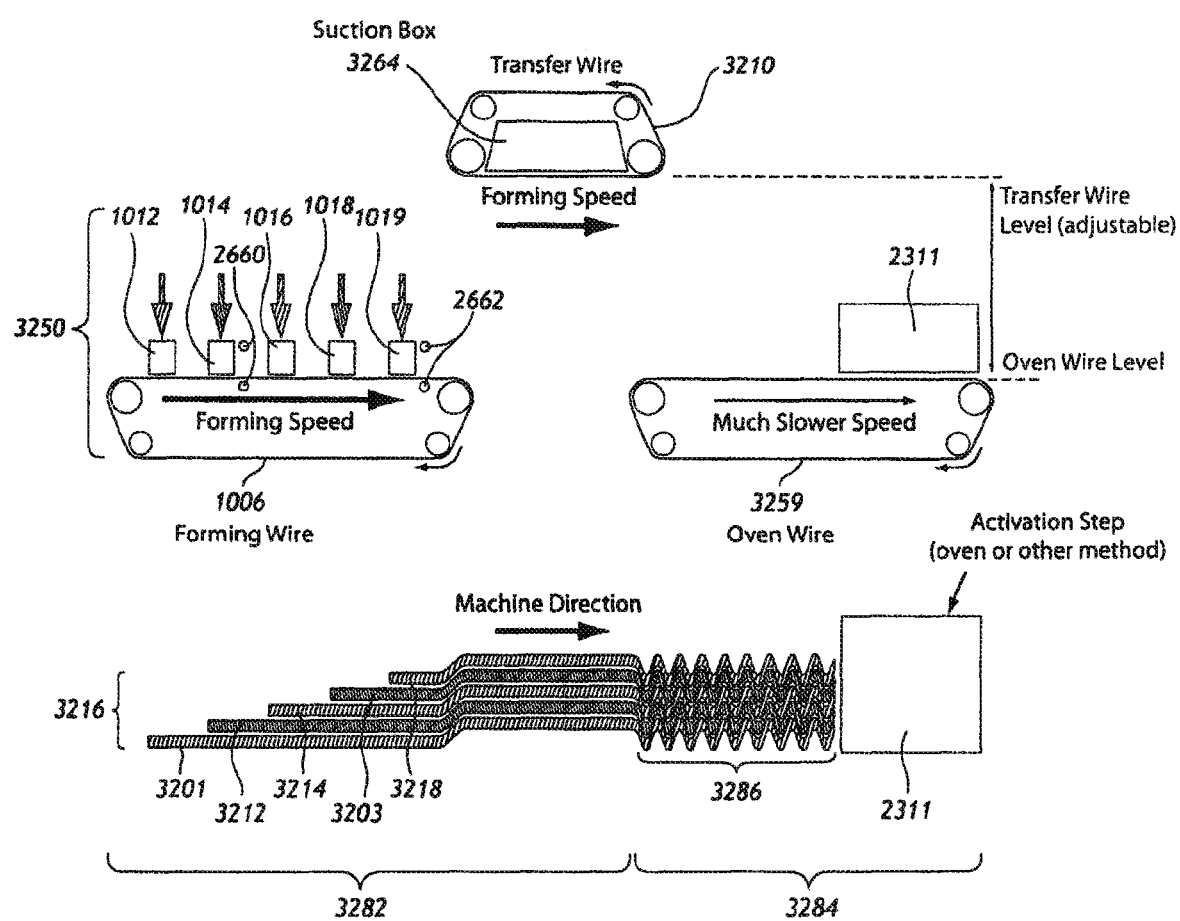

FIG. 32D shows an exemplary method of forming of a unitized composite made by depositing loose fiber assemblies, with the overall assembly being formed into a wave-like structure 3286 of higher frequency compared to 3226 of FIG. 32A, using an oven wire 3259 which is moving slower than the oven wire 3259 in FIG. 32A.

Practitioners skilled in the art can appreciate that the amplitude and wavenumber or wavelength of sinuous shaping can be adjusted over a wide range and can operate successfully on assemblies which vary widely in thickness and basis weights by employing independent variations in both the raised height of the transfer device and the relative speed of the transfer wire versus the oven wire.

Another aspect of certain embodiments of the present invention contemplates the addition of particles into the unitized composites. Introduction of a wide variety of particles and other materials, either into the individual layers or between the individual layers is also contemplated as being of special advantage providing a highly desirable way to stabilize high concentrations of particulate material, both within the layers and in the cavities resulting after activation of the contractive behavior.

Figure 33:
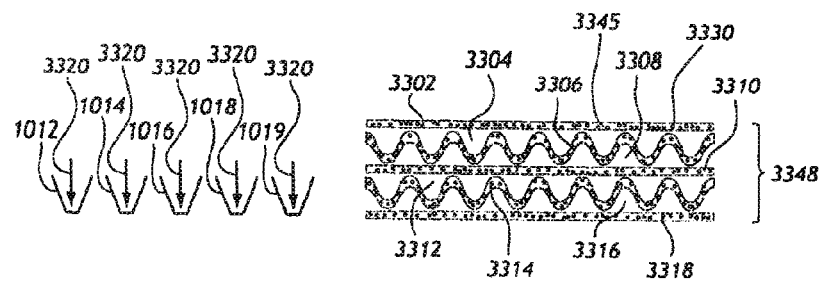
FIG. 33 shows the addition of particles to the interiors of layers made by introducing particles within the forming heads.
Figure 34:
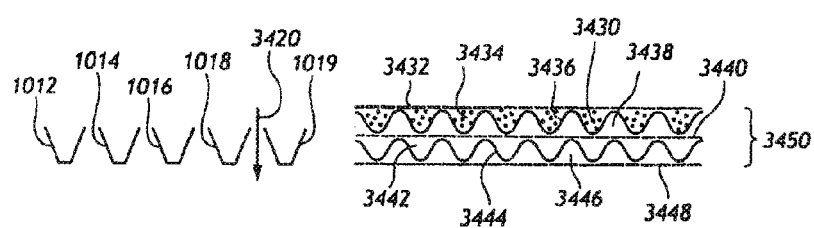
Figure 35:
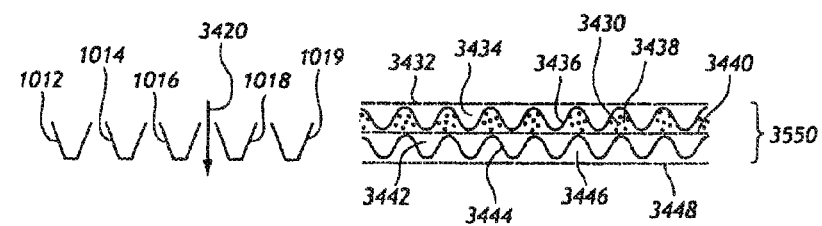

FIG. 33 shows exemplary optional addition of particles 3330 to the all of the individual layers 3302, 3306, 3310, 3314, 3318 made with the addition of particles with forming heads 1012, 1014, 1016, 1018, 1019 at locations 3320 during the assembly of the layers and their resulting general location within the unitized composite 3348 after bonding. Cavities 3304, 3308, 3312, and 3316 remain relatively empty and devoid of particles. Any combination of layers, with or without particles, is contemplated.

FIGS. 34 through 48 show exemplary composites having additions of particles 3430 which are made by adding particles in between the five forming heads 1012, 1014, 1016, 1018, 1019 during the assembly of the layers, before the assembly is shaped into a corrugated or sinuous shape. The resulting structure has particles located within cavities formed between elements in the unitized composite after activation. The particles in the resulting structure can be sufficiently localized within cavities to prevent substantial migration.

Practitioners skilled in the art will recognize that the many individual flat-surfaced elements are optionally combined with other sinuous elements in the z-direction and that many possible combinations of resulting cavities are contemplated as being within the spirit of the invention. Further, skilled practitioners will recognize that many types and forms of particles, in many combinations, can be added without departing from the spirit of this invention. Indeed, careful selection and placement of particles in multiple locations within the various cavities is specifically contemplated as offering advantages in the effective use of the functionality provided by the particles. Both blended mixtures and mono-component particles meant to be kept separated from other particles of different types within the overall unitized composite structure are contemplated. Providing open or relatively open and empty cavities, including optionally partial filling of such cavities with fibers or lower-density fuzzy surfaces, is desirable for example to provide space for expansion in the z-direction for swellable particles (such as superabsorbent particles as used in baby diapers) or for cross-linkable resins or foaming materials which can be included and optionally activated in a subsequent process. Additionally, enhanced stability of loose powders in the assembly has been discovered by practice of the invention. Further, very high concentrations of particles can be retained in the cavities without significant migration.

Examples of particles that may be incorporated into open cavities defined between sinuous and flat layers include thermosettable particles, thermoplastic particles and cementitious particles that can be reacted at conditions substantially different from those used to cause activation of the unitized composite (e.g., contraction of at least one layer of material that becomes relatively flat in the completed structure). Under these different sets of conditions the particles may undergo a chemical reaction (e.g., cross-linking in the case of thermosettable particles), a phase change (e.g., melting in the case of thermoplastic particles), or curing (such as under the influence of moisture in the case of cementitious particles). Examples of cementitious particles include those materials having a cement-like, cementing, or bonding type property, and include Portland cement, plaster and the like.

The exemplary embodiments in Table 1, demonstrating practice of the present invention, are made by airlaid forming of loose fiber assemblies using a through dryer oven for activation and bonding and using a raised transfer wire device moving relatively faster than the oven wire, as generally depicted in FIGS. 32A-D. A suitable airlaid forming system with five forming heads, intermediate compression rolls, a loose fiber assembly transfer device capable of being raised in the z-direction, and a four-zone adjustable oven configured for manufacturing embodiments of the present invention (available for public use from Marketing Technology Service, Inc. of Kalamazoo Mich.) was employed to produce samples in Table 2, according to the recipes shown and using the specified machinery settings shown in Table 1.

Table 2 also references figures showing the general shaping and resulting general structure of the unitized composites developed after activation. FIGS. 50-77 are optical micrographs showing side views of the exemplary structures, magnified by 2× and 4×.

The thermoplastic binder fibers used in the exemplary embodiments are typical bi-component bonding fibers available to the airlaid industry commercially, although many other fibers suitable for practice of the invention are available. Trevira T-255 grade of 1.55 denier is available for purchase from Trevira Gmbh of Augeburg Germany and is abbreviated as "Trev" in Table 1. ESC806A AL AD grade is available for purchase from Fibervision A/S of Athens Ga. USA and is abbreviated as "ALAD" in Table 1. Fortrel 6 denier polyester fiber is available for purchase from Wellman Inc. of Darlington S.C. USA and is abbreviated as "PET" in Table 1, and where 15 denier polyester is used, it is abbreviated as "15 d PET." The length of the synthetic fibers used was about six millimeters, although much longer and much shorter fibers are optionally selected for the practice of the present invention, and many types of fibers can be used as bonding fibers. The average length of the softwood cellulose fluff pulp grade (Rayfloc—J-LD-E, available for purchase from Rayonier Inc. of Jesup Ga. and abbreviated as "pulp") is about 3 mm. The invention contemplates that many fibers can be used and can be much longer or much shorter then those described herein. The components useful for the practice of the present invention can be hydrophilic, hydrophobic or a combination of both hydrophilic and hydrophobic materials. Suitable fibers for use in the present invention include many cellulose fibers (such as wood pulp and cotton), modified cellulosic fibers (such as rayon and Lyocell), cellulose acetate, hemp, jute, flax, polyester, polypropylene, polyethylene, PLA and many other synthetic, mineral (e.g., glass), and natural materials which can be utilized alone or in blends with other nonfibrous materials. These components can also be blended together in a wide variety of recipes to achieve desired attributes.

Table 1 shows the grams per square meter of each fibrous component deposited in each airlaid forming head during assembly, the conditions and pressures applied for compression rolls (labeled "Comp A" and "Comp B" in Table 1), the height of the raised transfer wire relative to the surface of the oven wire, and the speeds of the transfer wire and the oven wire. The formulas and machinery conditions listed in Table 1 (including the raised transfer height and relative speed of the transfer wire and oven wire) follow the airlaid fibrous deposition configuration as generally illustrated in FIG. 32A. The oven temperatures used in the activation step were set to 140 degrees centigrade in the first three oven zones and 155 degrees centigrade in the fourth oven zone for all examples shown in Table 1.

TABLE 1

| Row # | Head 1 gsm Ref 32A #1012 | Head 2 gsm Ref 32A #1014 | Comp A Ref 32A #2660 | Head 3 gsm Ref 32A #1016 | Head 4 gun Ref 32A #1018 | Head 5 gsm Ref 32A #1019 | Comp B Ref 32A #2662 | Raised Transfer Height | Transfer Speed m/min | Oven Speed m/min |
|---|---|---|---|---|---|---|---|---|---|---|
| 1 | 70 ALAD | OFF | OFF | OFF | 20 Trev 50 pulp | OFF | No heat 0 Bar | 2 mm | 10 | 10 |
| 2 | 70 ALAD | OFF | OFF | OFF | 20 Trev 50 pulp | 70 ALAD | No heat 0 Bar | 2 mm | 10 | 10 |
| 3 | 35 ALAD | 10 Trev 25 pulp | OFF | 35 ALAD | OFF | OFF | 100° C. 0 Bar | 7 mm | 28 | 22.4 |
| 4 | 35 ALAD | 10 Trev 25 pulp | OFF | 35 ALAD | OFF | OFF | 100° C. 0 Bar | 7 mm | 28 | 19.6 |
| 5 | 70 ALAD | 20 Trev 50 pulp | OFF | 70 ALAD | OFF | OFF | 100° C. 0 Bar | 7 mm | 14 | 11.2 |
| 6 | 109 ALAD | 191 Trev | OFF | 98 ALAD | OFF | OFF | No heat 0 Bar | 11 mm | 5 | 4 |
| 7 | 109 ALAD | 143 Trev 48 PET | OFF | 98 ALAD | OFF | OFF | No heat 0 Bar | 14 mm | 5 | 4 |
| 8 | 109 ALAD | 98 Trev 130 pulp | OFF | 98 ALAD | OFF | OFF | 75° C. 0 Bar | 12 mm | 5 | 4 |
| 9 | 50 ALAD | OFF | No heat 0 Bar | OFF | 105 Trev 35 15d PET | 50 ALAD | Noheat 0 Bar | 22 mm | 8 | 2 |
| 10 | 109 ALAD | 143 Trev 48 PET | OFF | 98 ALAD | 156 Trev 52 PET | 131 ALAD | No heat 0 Bar | 14 mm | 5 | 4 |
| 11 | 109 ALAD | 191 Trev | OFF | 98 ALAD | 208 Trev | 131 ALAD | No heat 0 Bar | 22 mm | 5 | 4 |
| 12 | 109 ALAD | 98 Trev 130 pulp | OFF | 98 ALAD | 104 Trev 130 pulp | 131 ALAD | 75° C. 0 Bar | 12 mm | 5 | 4 |
| 13 | 109 ALAD | 191 Trev | No heat 0 Bar | 98 ALAD | 208 Trev | 131 ALAD | No heat 0 Bar | 14 mm | 5 | 4 |
| 14 | OFF | 191 Trev | OFF | 98 ALAD | 208 Trev | OFF | No heat 0 Bar | 12 mm | 5 | 4 |
| 15 | OFF | 98 Trev 130 pulp | OFF | 98 ALAD | 104 Trev 130 plup | OFF | 75° C. 0 Bar | 12 mm | 5 | 4 |
| 16 | 70 ALAD | 20 Trev 50 pulp | OFF | OFF | OFF | OFF | 100° C. 1 Bar | 7 mm | 14 | 11.2 |
| 17 | 109 ALAD | 143 Trev 48 PET | OFF | OFF | OFF | OFF | No heat 0 Bar | 14 mm | 5 | 4 |
| 18 | 109 ALAD | 191 Trev | OFF | OFF | OFF | OFF | No heat 0 Bar | 7 mm | 5 | 4 |
| 19 | 109 ALAD | 98 Trev 130 pulp | OFF | OFF | OFF | OFF | 75° C. 0 Bar | 12 mm | 5 | 4 |
| 20 | 109 ALAD | 191 Trev | OFF | 98 ALAD | 208 Trev | OFF | No heat 0 Bar | 16 mm | 5 | 4 |
| 21 | 109 ALAD | 143 Trev 48 PET | OFF | 98 ALAD | 156 Trev 52 PET | OFF | No heat 0 Bar | 14 mm | 5 | 4 |
| 22 | 109 ALAD | 98 Trev 130 pulp | OFF | 98 ALAD | 104 Trev 130 pulp | OFF | 75° C. 0 Bar | 12 mm | 5 | 4 |
| 23 | 7 PET 6D 63 ALAD | 18 PET 52 Trev | OFF | | OFF | OFF | No heat 0 Bar | 7 mm | 10 | 8 |
| 24 | 7 PET 6D 63 ALAD | 18 PET 52 Trev | | | 7 PET 63 ALAD | | No heat 0 Bar | 7 mm | 10 | 8 |
| 25 | 70 ALAD | OFF | OFF | OFF | 20 Trev 50 pulp | 70 ALAD | No heat 0 Bar | 11 mm | 11.4 | 9.1 |
| 26 | 61.4 ALAD | OFF | OFF | OFF | 17.5 Trev 43.9 pulp | 61.4 ALAD | No heat 0 Bar | 11 mm | 11.4 | 8 |
| 27 | 70 ALAD | OFF | OFF | OFF | 20 Trev 50 pulp | 70 ALAD | No heat 0 Bar | 6 mm | 10 | 8 |

FIG. 49 depicts a testing apparatus 4900 suitable for evaluating the resistance to bending forces in relatively thick composites. The device is a modification to a Thwing-Albert QC-1000 tensile tester model OC-1000, commonly used to evaluate tensile strength of paper and other fabrics. A T-A Load Cell Model: RSB-1 with a capacity of 2000 grams 4970 attached to pivot holder 4901 is attached to a flexible wire 4905 which is attached to clamp 4910 by eyebolt 4985. The clamp is a commonly available office paper binder clip available from Quill Corporation of medium size and modified to include an eyebolt affixed to the center of the clamp. The overall clamp assembly weighs 18 grams and grips the sample 4960 one centimeter 4920 from its leading edge. The sample to be tested 4960 is affixed to a support block 4940, 5.2 cm in height and 15.5 cm in width, which is attached to the traveling support 4950 a distance of 1.5 cm from its center as shown in 4990. A support plate 4955 weighing 400 grams, with dimensions of 15.5 cm by 5.5 cm, is clamped to the support block 4940 with shim spacers 4930 inserted equal to the uncompressed thickness of the sample 4960. The sample 4960, with dimensions of 5 cm by 10 cm, overhangs the edge of support block 4940 by 5 cm as shown in 4915.

During the test, the load cell is first zeroed, and the test is initiated by causing traveling support 4950 to descend 2 cm at a rate of 3.87 cm/minute and causing deflection of sample 4960 exerting force on load cell 4970. The highest reading of force measured during the test, or at the 2 cm end point, is measured and recorded in Table 2 as bending force.

Table 2 shows bending force measured in both the MD and CD directions and the ratio of MD to CD bending force, as well as the final basis weight and densities of the unitized composites produced according to the recipes and conditions described in Table 1.

TABLE 2

Figure 36:
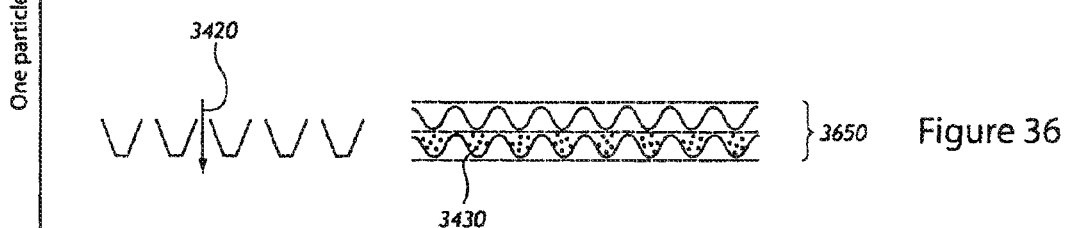
Figure 37:
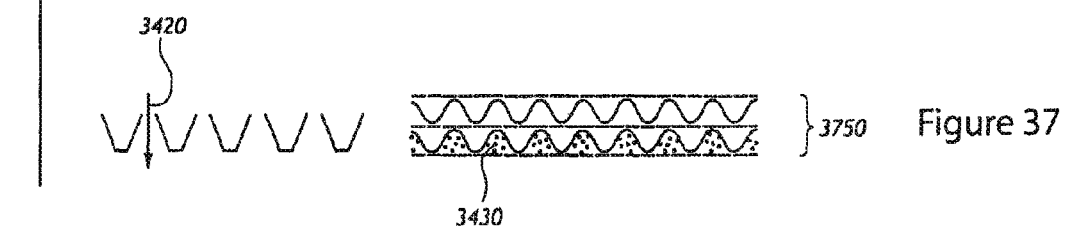

| Row # | Reference Unitized Composite Figure | Optical Micrograph Figure | Final Basis Wt gsm | Final thickness cm | Final Density g/cm3 | MD Bending Force kg | CD Bending Force kg | MD/CD Ratio |
|---|---|---|---|---|---|---|---|---|
| 1 | FIG. 1 | 50 | 138 | 0.13 | 0.11 | 0.0062 | 0.0064 | 0.969 |
| 2 | FIG. 1 | 51 | 212 | 0.17 | 0.12 | 0.0322 | 0.0286 | 1.126 |
| 3 | FIG. 5A | 52 | 116 | 0.05 | 0.23 | 0.0026 | 0.0048 | 0.542 |
| 4 | FIG. 5A | 53 | 144 | 0.10 | 0.14 | 0.0014 | 0.0068 | 0.206 |
| 5 | FIG. 5A | 54 | 204 | 0.20 | 0.10 | 0.0172 | 0.0362 | 0.475 |
| 6 | FIG. 5A | 55 | 497 | 0.21 | 0.24 | 0.3450 | 0.4450 | 0.775 |
| 7 | FIG. 5A | 56 | 511 | 0.26 | 0.20 | 0.2290 | 0.2908 | 0.787 |
| 8 | FIG. 5A | 57 | 532 | 0.51 | 0.10 | 0.2322 | 0.2696 | 0.861 |
| 9 | FIG. 5A | 58 | 930 | 1.10 | 0.08 | 0.3234 | 1.0128 | 0.319 |
| 10 | FIG. 5B | 59 | 878 | 0.48 | 0.18 | 0.6130 | 0.6738 | 0.910 |
| 11 | FIG. 5B | 60 | 949 | 0.35 | 0.27 | 0.8420 | 0.9862 | 0.854 |
| 12 | FIG. 5B | 61 | 959 | 0.90 | 0.11 | 0.5292 | 0.6682 | 0.792 |
| 13 | FIG. 5B | 62 | 1068 | 0.63 | 0.17 | 0.8550 | 1.0990 | 0.778 |
| 14 | FIG. 6A | 63 | 535 | 0.54 | 0.10 | 0.2248 | 0.3276 | 0.686 |
| 15 | FIG. 6A | 64 | 657 | 0.91 | 0.07 | 0.1712 | 0.3300 | 0.519 |
| 16 | FIG. 6B | 65 | 171 | 0.13 | 0.13 | 0.0062 | 0.0186 | 0.333 |
| 17 | FIG. 6B | 66 | 377 | 0.62 | 0.06 | 0.0722 | 0.1606 | 0.450 |
| 18 | FIG. 6B | 67 | 379 | 0.42 | 0.09 | 0.1198 | 0.2838 | 0.422 |
| 19 | FIG. 6B | 68 | 456 | 0.62 | 0.07 | 0.0818 | 0.2162 | 0.378 |
| 20 | FIG. 6C | 69 | 709 | 0.66 | 0.11 | 0.4888 | 0.7200 | 0.679 |
| 21 | FIG. 6C | 70 | 733 | 0.87 | 0.08 | 0.3720 | 0.5816 | 0.640 |
| 22 | FIG. 6C | 71 | 796 | 1.10 | 0.07 | 0.3378 | 0.4950 | 0.682 |
| 23 | FIG. 7 | 72 | 158 | 0.37 | 0.04 | 0.0092 | 0.0162 | 0.568 |
| 24 | FIG. 8 | 73 | 271 | 0.17 | 0.16 | 0.0522 | 0.0708 | 0.737 |
| 25 | FIG. 9B | 74 | 247 | 0.24 | 0.10 | 0.0386 | 0.0534 | 0.723 |
| 26 | FIG. 10A, 9A | 75 | 267 | 0.31 | 0.09 | 0.0536 | 0.0664 | 0.807 |
| 27 | FIG. 10B | 76 | 260 | 0.26 | 0.1 | 0.0534 | 0.0766 | 0.700 |
| 28 | FIG. 36 | 77 | 1137 | 0.63 | 0.18 | | | |

While preferred embodiments of the invention have been shown and described herein using the example embodiments shown in Table 1, embodiments are provided by way of example only, in part because of the special flexibility of the present invention to easily produce an unusually wide variety of structures with numerous types of materials. Such flexibility ensures that other applications, variations, changes and substitutions will occur to those skilled in the art without departing from the spirit of the present invention. Also, the embodiments selected for illustration in the figures are not shown to scale and are not limited to the proportions shown in the figures or recipes employed in the examples in Table 1.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A composite comprising a structure having two or more layers, at least one of the layers comprising a sinuous layer and at least one of the layers comprising a relatively flat layer, the relatively flat layer comprised of contracted material fused to the sinuous layer.

2. The composite of claim 1 wherein at least one layer is a previously made roll good material.

3. The composite of claim 1 wherein at least one layer is an in situ produced nonwoven material.

4. The composite of claim 1 wherein the at least one sinuous layer comprises two sinuous layers wherein each of said sinuous layers is located at each of two exterior locations of said composite.

5. The composite of claim 1 wherein the at least one flat layer comprises two flat layers wherein each of said flat layers is located at each of two exterior locations of said composite.

6. The composite of claim 1 having relatively open cavities defined between the sinuous and flat layers which can optionally contain particles.

7. The composite of claim 6 in which the cavities contain particles, and wherein said particles are sufficiently localized to prevent substantial migration.

8. A composite of claim 6 wherein the particles are carbon or mixtures of carbon and other particles.

9. A composite of claim 6 wherein the particles are cement, plaster or similar materials which react to bond together when water or some other fluid or agent is applied to said particles.

10. A composite of claim 6 wherein the open cavities contain particles and the particles are materials which can be caused to react at selected predetermined conditions.

11. A composite of claim 10, wherein the particles are selected from thermosettable, thermoplastic or cementitious.

12. A composite of claim 1, wherein at least one of the exterior surfaces has protruding fibers.

* * * * *